US009561975B2

(12) United States Patent
Stone et al.

(10) Patent No.: US 9,561,975 B2
(45) Date of Patent: Feb. 7, 2017

(54) LOW ENERGY VORTEX LIQUID TREATMENT SYSTEMS AND METHODS

(71) Applicants: Johnny Lee Stone, Las Vegas, NV (US); Avery Matthew Stone, Las Vegas, NV (US); Gerald Donald Richardson, San Jose, CA (US)

(72) Inventors: Johnny Lee Stone, Las Vegas, NV (US); Avery Matthew Stone, Las Vegas, NV (US); Gerald Donald Richardson, San Jose, CA (US)

(73) Assignee: Stone WaterWorks, Inc., Las Vegas, NV (US)

( * ) Notice: Subject to any disclaimer, the term of this patent is extended or adjusted under 35 U.S.C. 154(b) by 111 days.

(21) Appl. No.: 14/583,470

(22) Filed: Dec. 26, 2014

(65) Prior Publication Data

US 2015/0196880 A1     Jul. 16, 2015

Related U.S. Application Data

(60) Provisional application No. 61/926,412, filed on Jan. 13, 2014.

(51) Int. Cl.
| | | |
|---|---|---|
| C02F 1/74 | (2006.01) | |
| C02F 3/32 | (2006.01) | |
| A01K 63/04 | (2006.01) | |
| A01G 31/00 | (2006.01) | |
| B01F 15/00 | (2006.01) | |
| E04H 4/12 | (2006.01) | |
| B01F 3/00 | (2006.01) | |
| B01F 11/00 | (2006.01) | |
| B01F 15/02 | (2006.01) | |
| B01F 3/04 | (2006.01) | |
| C02F 103/42 | (2006.01) | |

(52) U.S. Cl.
CPC .............. *C02F 1/74* (2013.01); *A01K 63/042* (2013.01); *B01F 3/0451* (2013.01); *B01F 11/0071* (2013.01); *B01F 15/024* (2013.01); *E04H 4/1281* (2013.01); *A01G 31/00* (2013.01); *A01G 2031/006* (2013.01); *C02F 2103/42* (2013.01); *C02F 2201/009* (2013.01); *C02F 2301/024* (2013.01); *C02F 2303/04* (2013.01); *Y02P 60/216* (2015.11); *Y10T 137/0391* (2015.04)

(58) Field of Classification Search
CPC ... C02F 1/74; C02F 2103/42; C02F 2201/009; C02F 2301/024; C02F 2303/04; A01K 63/042; A01G 31/00; A01G 2031/006; B01F 11/0071; B01F 15/024; B01F 3/0451; E04H 4/1281; Y10T 137/0391
USPC .......... 210/602, 621, 167.1, 167.11, 167.21, 210/221.1, 221.2; 261/77, 121.1; 119/261
See application file for complete search history.

(56) References Cited

U.S. PATENT DOCUMENTS 6,273,402 B1 *  8/2001  Cheng ................. B01F 3/04609
                                                                      210/242.2
8,047,808 B2    11/2011  Kondo
(Continued)

*Primary Examiner* — Fred Prince
(74) *Attorney, Agent, or Firm* — Christopher Pilling

(57) ABSTRACT

A method comprises steps for (a) providing a liquid in a container; (b) flowing a gas to a volume within the liquid, wherein the volume is at least partially submerged in the liquid; and (c) repeatedly increasing and decreasing the volume, wherein the cycles of increasing and decreasing generates a pulsed aerated flow, wherein at least one of the pulsed aerated flow is released within the container and the pulsed aerated flow is released outside the container.

17 Claims, 31 Drawing Sheets

(56) References Cited

U.S. PATENT DOCUMENTS

| | | |
|---|---|---|
| 8,371,826 B1 | 2/2013 | Johnson et al. |
| 2011/0049047 A1* | 3/2011 | Cumin .................. B01D 61/08 |
| | | 210/636 |
| 2013/0233779 A1* | 9/2013 | Farrish .................. A01G 33/00 |
| | | 210/150 |

* cited by examiner

LOW ENERGY VORTEX LIQUID TREATMENT SYSTEMS AND METHODS

CROSS-REFERENCE TO RELATED APPLICATIONS

The present application claims priority to U.S. Provisional Patent Application Ser. No. 61/926,412, filed on Jan. 13, 2014, the disclosure of which is hereby incorporated in its entirety at least by reference.

BACKGROUND OF THE INVENTION

1. Field of the Invention

The present invention is in the technical field of air powered pumping systems. More particularly, the present invention relates to low energy vortex liquid treatment systems and methods.

2. Description of Related Art

The present invention pertains to and has application to pumping systems, in which a system of pumping liquid is desired. Specifically, pumping systems in which the only energy required is provided by an air source, such as an air pump or air compressor. Some problems and disadvantages with existing air powered pumping systems are flow characteristics and pumping height limitations.

A patent known to the inventor and described in U.S. Pat. No. 8,047,808 Kondo titled "Geyser Pump", provides an air powered liquid pumping system. A feature of the pumping system includes a pump for vertically moving a liquid upward. However, there is a physically limitation on the distance the liquid can travel upward, thus this pumping system is only suitable if the head is relatively low.

Another disadvantage of the above system is the flow characteristics of the pumped liquid. Although, it is an aerated liquid that may be beneficially in certain systems, it lacks a turbulent vortex flow. Further the above system requires more energy for each pumping cycle, and pumps less water per pumping cycle than the present invention.

A further disadvantage of the above system is the susceptibility to bacteria development. Specifically, the above system fails to significantly pump the particles in the water during each pumping cycle, leading to stagnation which cultures bacteria, such as cyanobacteria (blue-green algae).

Consequently, there is a need for an air powered pumping system that overcomes the above limitations and disadvantages, including limited pumping height limitations, generating a turbulent vortex flow, and adequately pumping particles while using less energy.

BRIEF SUMMARY OF THE INVENTION

In one embodiment of the present invention a liquid treatment system is provided, comprising a gas source, a container for containing the liquid, a pump submerged in the liquid, the pump including a housing consisting of a top portion, a lower portion, and an inner volume, the lower portion of housing including one or more openings allowing fluid communication between the inner volume and the container creating a liquid surface disposed in the inner volume, the top portion of the housing coupled to an inlet, the inlet coupled to the gas source to deliver a gas from the gas source to the inner volume, the gas is trapped within the inner volume of the housing creating an inner volume of gas, the housing coupled to an outlet, the pump includes a release feature coupled to the outlet, the release feature is positioned at a distance from the top portion, the gas source supplying the gas to the inlet such that: the inner volume of gas expands displacing the liquid surface in a downward direction, when the liquid surface reaches the release feature, the outlet delivers a liquid/gas mixture.

In one embodiment the release feature includes a plurality of cuts having a slope curve shape forming a plurality of wings, the plurality of wings regulating the oscillation behavior of the liquid/gas mixture. Also in one embodiment the outlet delivers an aerated vortex flow. Further in one embodiment the aerated vortex flow is delivered to the container to aerate the liquid. Still in one embodiment the aerated vortex flow is delivered to a plant bed, the aerated vortex flow not absorbed by the plant bed is returned to the container. In some embodiments the container is a fish tank.

In one embodiment the aerated vortex flow is delivered to a filter then returned to the container. Also in one embodiment the container is a swimming pool.

In some embodiments the pump includes a shape of at least one of a bell and a cylinder. Further in some embodiments the pump includes a material consisting of concrete or plastic, wherein the pump consisting of the plastic material includes a counter weight to overcome the buoyancy force of the inner volume of gas.

In one embodiment the gas source is powered by at least one of a solar panel and a windmill providing a self-sustained system.

In another aspect of the invention an aquaponic system is provided, comprising a gas source, a fish tank containing a liquid, a plurality of pumps submerged in the liquid, the plurality of pump having a housing consisting of a top portion, a lower portion, and an inner volume, the lower portion of housing including one or more openings allowing fluid communication between the inner volume and the fish tank creating a liquid surface disposed in the inner volume, the top portion of the housing coupled to an inlet, the inlet coupled to the gas source to deliver a gas from the gas source to the inner volume, the gas is trapped within the inner volume of the housing creating an inner volume of gas, the housing coupled to an outlet, the plurality of pumps include a release feature coupled to the outlet, the release feature is positioned at a distance from the top portion, the gas source supplying the gas to the inlet such that: the inner volume of gas expands displacing the liquid surface in a downward direction, when the liquid surface reaches the release feature, the outlet delivers an aerated vortex flow; and the release feature includes a plurality of cuts having a slope curve shape forming a plurality of wings, plurality of the wings regulating the oscillation behavior of the aerated vortex flow, the aerated vortex flow is delivered to a plant bed, the aerated vortex flow not absorbed by the plant bed is returned to the fish tank.

In yet another aspect of the invention a method of operating a gas pump is provided, comprising steps (a) providing a liquid in a container; (b) flowing a gas to a volume within the liquid, wherein the volume is at least partially submerged in the liquid; and (c) repeatedly increasing and decreasing the volume, wherein the cycles of increasing and decreasing generates a pulsed aerated flow, wherein at least one of the pulsed aerated flow is released within the container and the pulsed aerated flow is released outside the container.

In one embodiment, in step (c), a release feature is activated decreasing the volume. Also in one embodiment, in step (c) the pulsed aerated flow is a vortex flow. Also in one embodiment the vortex flow is used to treat contaminated liquid consisting of alums and particulates. Further in one embodiment the container is a swimming pool.

In one embodiment, in step (c), the pulsed aerated flow is pumped to a ground having plants; and further comprising a step (d) returning a liquid from the ground to the container. In one embodiment the container is a fish farm, the fish farm having a bedrock. In some embodiments the gas pump is buried in the bedrock.

DETAILED DESCRIPTION OF THE INVENTION

Figure 1:
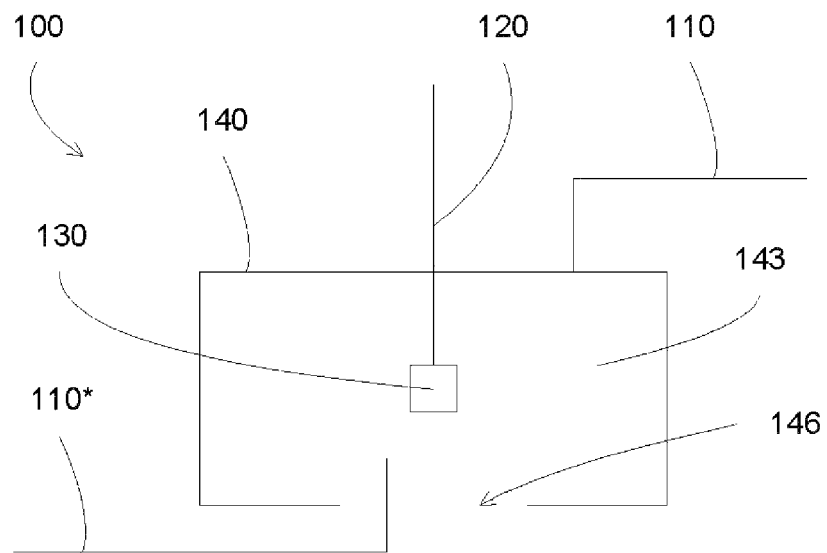
FIG. 1 illustrates an example of a gas pump according to some embodiments of the present invention.

In some embodiments, the present invention discloses a gas pumping system and method for pumping a fluid or mixture of gas and liquid, such as an aerated fluid flow. By cycling a gas volume or a pressure of a gas volume, a pulsed gas flow can be generated. By immersing the gas volume in a liquid, the pulsed gas flow can form a pulsed fluid or aerated fluid flow. Further, the cycling of the gas volume can provide agitating action to the liquid.

In some embodiments, the pumping system can utilize a gas flow, such as an air flow generated from an air pump, to increase a volume of gas. The gas flow can be constant, or can be a pulse gas flow. The gas volume can be submerged at least partially in a liquid. The pressure of the gas volume can be higher than atmospheric pressure, partly due to the gas volume submerged in the liquid. In some embodiments, the pumping system can be weighted down, for example, by its own weight or by adding weight onto it to counter the buoyancy force of the gas volume. By quickly reducing the gas volume, a strong pulsed gas flow can form, from the high pressure gas volume to the atmosphere or to the surrounding liquid. The gas flow can be released to the liquid, for example, to aerating the liquid. The gas flow can pull the surrounding liquid to generate a fluid flow or an aerated fluid flow, pumping the liquid to another location.

In some embodiments, the pumping system can include a housing having gas inlet to receive a gas flow, for example, from an air pump. The housing can be submerged in a liquid, and can communicate with the liquid. For example, the housing can have multiple openings at a bottom area, allowing the exchange of fluid between the inside and the outside of the housing. The inlet gas flow can displace the liquid within the housing, increasing the volume of gas in the housing. With the openings located at the bottom of the housing, the gas volume can increase without leaking to the liquid. The liquid level can rise, due to the increase of the gas volume.

The housing can have an outlet and a release feature coupled to the outlet. The gas volume can activate the release feature, and the gas within the gas volume can quickly escape to the outlet. The gas volume can be released to the liquid, forming bubbles and oxygenating the liquid. High pressure and pulse flow can significantly enhance the oxygenation, as compared to directly bubbling through an air pump. The quick release of the gas can create a force on the release feature, and can rotate a rotatable release feature.

Surrounding liquid within the vicinity of the outlet can also contribute to the gas flow, providing a gas/liquid mixture flow or an aerated fluid flow. The flow can be guided to a location outside the liquid, for example, pumping the liquid to a container or a filter. The flow can be returned to the liquid, after being filtered or performing other actions. The liquid level can decrease, due to the collapse of the gas volume. The cycling of the gas volume thus can generate a pulsating action in the liquid. The pulsating action can clean the liquid, together with inhibiting bacteria growth, thus enhancing the cleanliness of the liquid.

FIG. 1 illustrates an example of a gas pump according to some embodiments of the present invention. FIG. 1 shows a gas pump 100, which can include an open housing 140. The open housing 140 can have one or more openings 146, so that an inner volume 143 of the housing 140 can be fluidly communicated with the outside ambient. The housing 140 can be coupled to an inlet 110. The inlet 110 can be coupled to a gas source (not shown), such as an air pump or an air compressor. The inlet 110 is coupled to the housing as to deliver a gas from the gas source to the inner volume 143. The inlet 110 can be coupled to housing at a surface of the housing. The inlet 110 can couple to the surface, or can protrude toward the inner volume. Alternatively, an inlet 110* can be coupled to the housing at the openings 146. The housing 140 can be positioned so that the openings 146 is located at a lower portion of the housing, e.g., closer to the ground with respect to gravitational force, so that the gas can stay at the top of the housing, e.g., at the volume portion of the volume 143 that is opposite to the openings. The top of the housing can be with respect to gravitational force, e.g., the location where a gas bubble in a liquid ambient will bubble toward under gravity.

The housing 140 can be coupled to an outlet 120. The outlet 120 can deliver a gas, a liquid, or a gas/liquid mixture. The outlet 120 is coupled to the housing as to deliver a gas, a liquid, or a gas/liquid mixture from the inner volume 143 to the outside ambient. The outlet 120 can be coupled to housing at a surface of the housing. The outlet 120 can be coupled to the surface of the housing, or can protrude toward the inner volume. The end of the outlet 120 can include a release feature 130. The release feature 130 is configured to change a flow of the gas or liquid from the inner volume 143. For example, the release feature 130 can generate a turbulence flow, or can be rotated due to the gas pressure in the inner volume. The release feature 130 can be positioned at a distance from the top of the housing so to form a gas volume in the inner volume before the gas volume reaches the release feature.

Figure 2A:
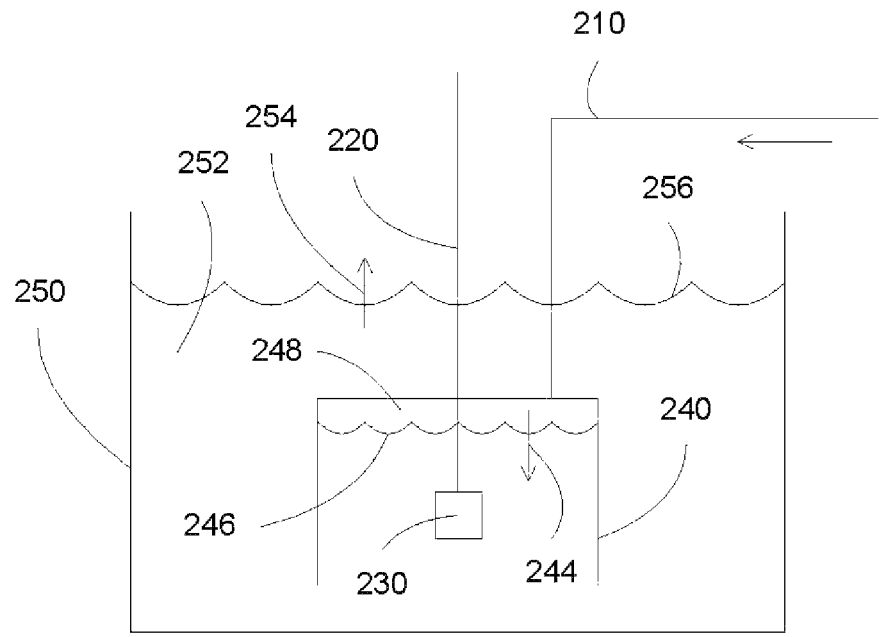
FIGS. 2A-2B illustrate an example of an operation of a gas pump according to some embodiments of the present invention.
Figure 2B:
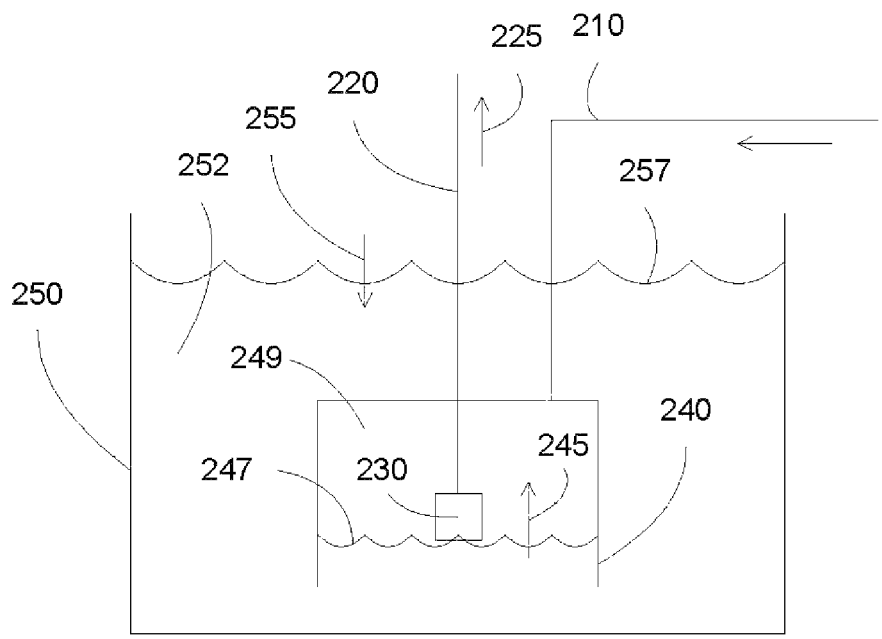

FIGS. 2A-2B illustrate an example of an operation of a gas pump according to some embodiments of the present invention. A container 250 can be provided within a liquid 252. A gas pump can be submerged in the liquid 252, either partially or fully. As shown, the pump is fully submerged, with the housing 240 of the pump is under the liquid surface 256 of the container 250. The housing 240 can be an open housing, thus the volume 248 in the housing can be in fluid connection with the surrounding liquid 252. The housing 240 can be positioned so that the opening is located at a bottom side, thus gas can be trapped within the volume 248 of the housing. An inlet 210 can be coupled to the housing or the volume 248 within the housing. The inlet 210 can deliver a gas, such as air, to the volume 248. As shown the inlet 210 is coupled to the top of the housing, but in general, the inlet 210 can be coupled to any surface of the housing. The inlet 210 can be coupled to the volume 248, e.g., without physically connected to the housing 240. In some embodiments, the inlet 210 is configured to deliver a gas to the volume 248 of the housing. Thus the end of the inlet 210 can be position at or near the opening so that gas can be bubbles to the volume 248. In some embodiments, the inlet 210 can be position away from the housing; as long as some gas can be trapped in the volume with some can be released to the surface 256 of the liquid 252.

As shown in FIG. 2A, with gas delivered to the volume 248, the volume 248 can expand, pushing the liquid surface 246 down, e.g., in direction 244. The liquid surface 256 can be pushed up, e.g., in direction 254, since the liquid 252 is incompressible. The gas is accumulated in the volume 248. The pressure in the volume 248 can be higher than atmospheric pressure due to the liquid pressure. For example, if the housing 240 is fully submerged under the liquid surface 256, the difference between the gas pressure in the volume 248 and atmospheric pressure can be proportional to the height of the housing submersion. The deeper the housing is submerged under the liquid, the higher the pressure of the volume 248.

As shown in FIG. 2B, the gas volume is expanded 249 to reach the release feature 230 of the pump. The liquid is correspondingly lowered to level 247, which is near or at the release feature 230. The release feature 230 can provide a path along the outlet 220 for the gas in volume 249 and for the liquid in the vicinity of the release feature 230, e.g., liquid at surface 247. The gas and liquid can escape through the release feature along the outlet 220, e.g., in direction 225, forming a flow in the outlet 220. The flow can include a gas and liquid mixture or an aerated liquid. In the flow, gas can be diffused to the liquid, or can travel along with the liquid.

The release action can happen quickly, e.g., can be faster than the accumulation of gas in the volume 248 to enlarge to volume 249. Thus a large amount of gas in the volume 249 can be released, pulling the liquid level 247 back up, e.g., in direction 245. Correspondingly, the liquid level in the container is lowered 257, e.g., in direction 255. The movement of the liquid within the housing and the liquid within the container can form an agitating action for the liquid 252, thus the liquid at the bottom of the container, near the pump and near the opening of the pump, can be pulsated, e.g., oscillating back and forth. The movement of the liquid can prevent stagnation, thus can improve the cleanliness of the liquid, especially at the bottom of the container.

The release action can exert a force on the release feature, thus can rotate the release feature if the release feature is rotatable. In some embodiments, the rotation of the release feature can further contribute to the movement of the liquid.

The pumping action can be repeated, with the gas volume in the housing oscillating back and forth between volumes 248 and 249, and the liquid surface level oscillating back and forth between levels 246 and 247. The volumes 248, 249 and corresponding surface levels 246, 247 are shown for illustrative purposed, and does not limit the validity of the present invention. In general, the volumes and the surface levels oscillate back and forth at or near the release feature, with the magnitude of the oscillation depending on the pump conditions, e.g., the gas inlet flow, the depth of the housing submersion, and depending on the pump configuration, e.g., the release feature design and the outlet size. The pumping action can deliver a mixture of liquid and gas along the outlet 220, in a pulsing fashion.

In some embodiments, the pumping system can utilize a gas flow to increase a gas pressure of a gas volume. The gas volume can be submerged at least partially in a liquid. By quickly reducing the gas pressure, a strong pulsed gas flow can form. The gas flow can be released to the liquid, for example, to aerating the liquid. The gas flow can pull the surrounding liquid to generate an aerated fluid flow, pumping the liquid to another location. The gas volume can be constant, for example, confined in a rigid housing. The gas volume can vary, for example, confined in a flexible housing and enlarged during the gas inlet flow and reduced during the release of gas.

Figure 3A:
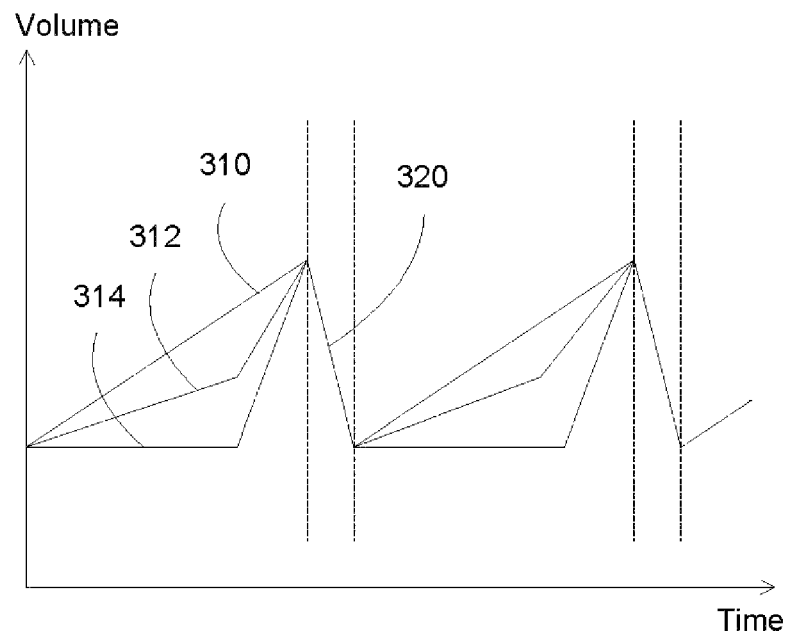
FIGS. 3A-3B illustrate examples of volume and flow as a function of time according to some embodiments of the present invention.
Figure 3B:
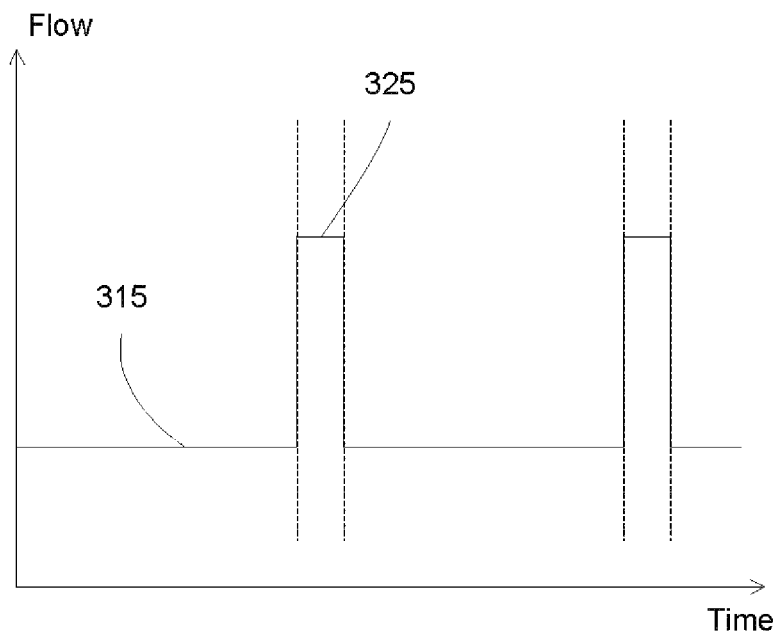

FIGS. 3A-3B illustrate examples of volume and flow as a function of time according to some embodiments of the present invention. In FIG. 3A, a behavior of a gas volume, e.g., the gas volume within a housing of a pump such as the one described above, is shown as a function of time. For a constant gas flow, e.g., from a gas pump that can deliver a constant gas flow, the volume can increase linearly (curve portion 310), to reach a maximum volume. The maximum volume can be corresponded to the release feature position and configuration. After reaching the release feature, the volume is released and can quickly reduce (curve portion 320). The volume can be dropped to a minimum volume, which can be corresponded to the release feature and the operating conditions of the pump. The volume can rise again, and oscillate back and forth between the maximum and the minimum volume.

Alternatively, the gas flow can be non-constant. For example, a burst gas flow (curve portion 314) can quickly provide a gas volume to the housing. The operation of the pump is then similar, with the volume drops to the minimum volume level (curve portion 320) due to the release feature. Any other gas flow can be used, such as a slow flow followed by a faster flow (curve portion 312).

FIG. 3B shows the flow behavior as a function of time. In general, the flow is operated in pulse mode, without any flow (curve portion 315) during the built up of the gas volume, and a flow (curve portion 325) during the release of the gas volume. Different gas flow behavior during the volume built up can have minimum or no effect on the pulse flow.

Figure 4A:
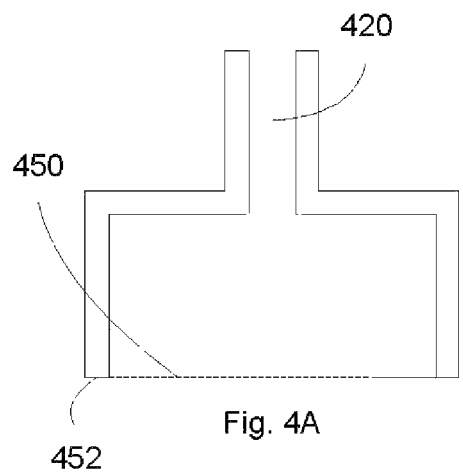
FIGS. 4A-4F illustrate various configurations of a release feature according to some embodiments of the present invention.
Figure 4B:
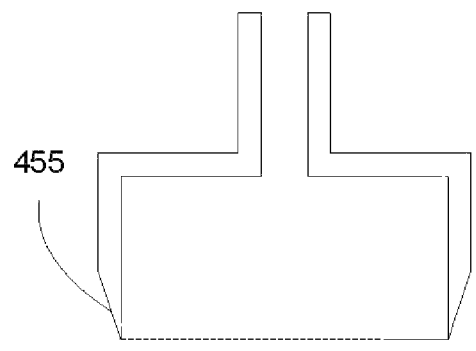

FIGS. 4A-4F illustrate various configurations of a release feature according to some embodiments of the present invention. In FIG. 4A, the release feature can include an opening 450. When the liquid level drops below the opening, pathway to the outlet 420 is open, and gas and liquid can escape through the opening 450. After the escape of gas, the gas pressure and/or volume is reduced, and the liquid rises to above the opening. High gas flow rate or high pressure gas flow can oscillate the liquid level below and above the opening, pumping the liquid and gas through the outlet 420. The walls 452 of the opening thickness can be flat. FIG. 4B shows a variation of the release feature, with the walls 455 of the opening thickness forming sharp angle. As shown, the angle is form at the inner surface, but the angle can be formed at the outer surface.

Figure 4C:
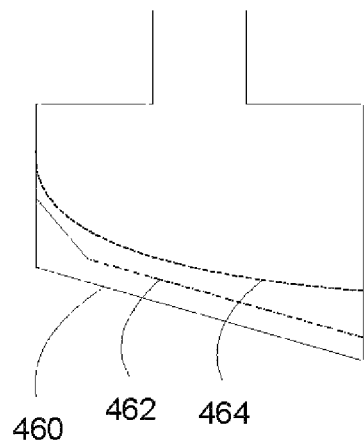
Figure 4D:
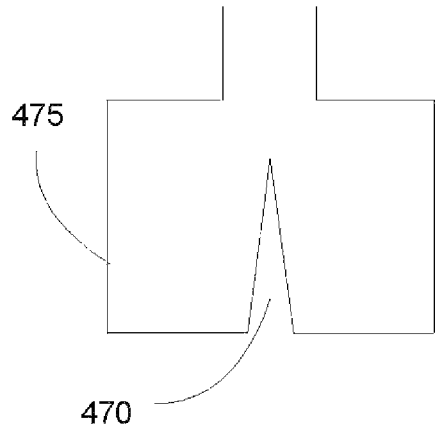

FIG. 4C shows other variations of the release feature, with the opening making an angle with the liquid level. Different release features having different slanted openings 460, 462, or 464 can have different behavior due to the difference in opening when the liquid level crosses the opening. For example, slanted 460 can be linear. Slant 462 can have different slopes. Slant 464 can be a curved line. The walls of the opening thickness can be flat or forming sharp angle. FIG. 4D shows another variation of the release feature, having a cut 470 in a wall of the outlet portion 475. The cut 470 can regulate the oscillation behavior of the liquid/gas movement, since the opening is larger when the liquid level drops. The walls of the opening thickness can be flat or forming sharp angle.

Figure 4E:
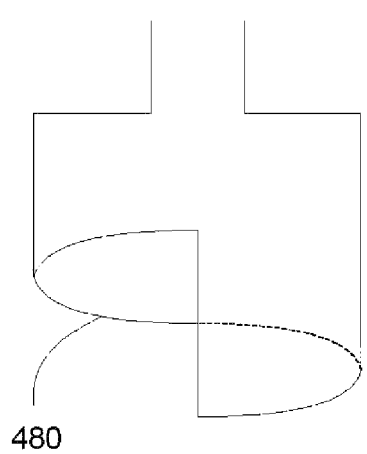
Figure 4F:
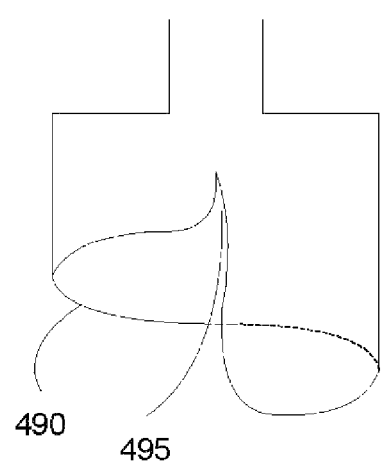

FIG. 4E shows another variation of the release feature, having the bottom portion 480 forming a spiral curve. The spiral curve can regulate the oscillation behavior of the liquid/gas movement, together with forming turbulence due to rotating action of the liquid at the spiral interface. The walls of the opening thickness can be flat or forming sharp angle. FIG. 4F shows another variation of the release feature, having the bottom portion 490 forming a spiral curve together with a cut 495 at the wall. The spiral curve can regulate the oscillation behavior of the liquid/gas movement, together with forming turbulence due to rotating action of the liquid at the spiral interface. The walls of the opening thickness can be flat or forming sharp angle. Different end portions of the release feature can have different pumping actions.

Figures 5A, 5B:
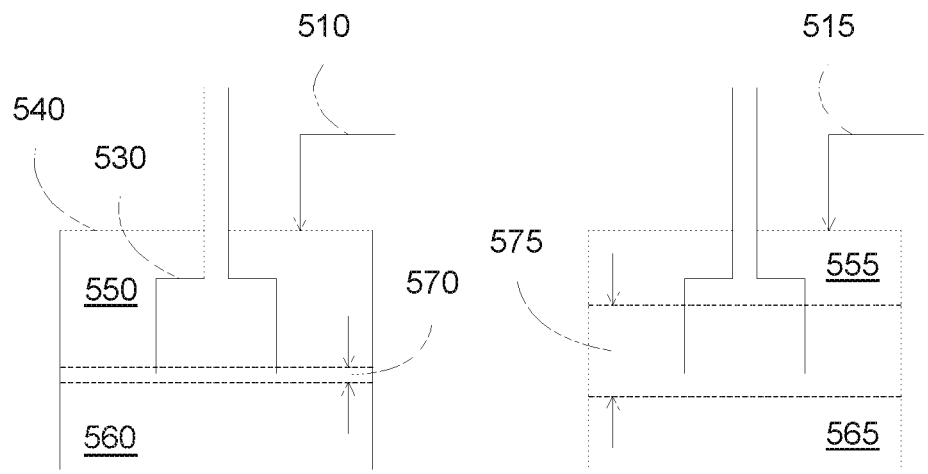
FIGS. 5A-5C illustrate behavior of an example of a release feature having a flat end portion according to some embodiments of the present invention.
Figure 5C:
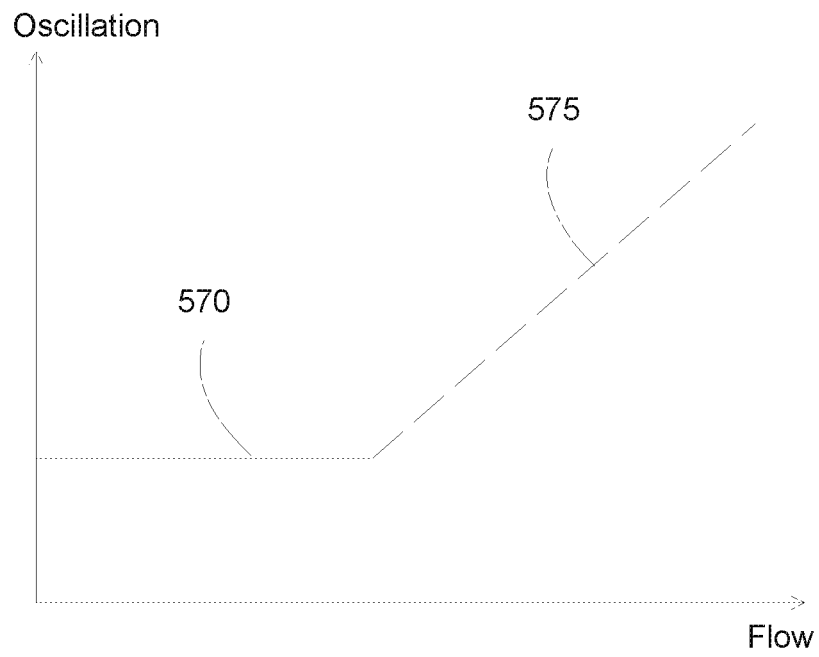

FIGS. 5A-5C illustrate behavior of an example of a release feature having a flat end portion according to some embodiments of the present invention. In FIG. 5A, the release feature 530 can be disposed in a container 540. The end portion of the release feature 530 can be flat, e.g., disposed in parallel with the level of the liquid 560. A low gas flow 510 can cause the liquid level to oscillate at the opening of the end portion, having a small oscillation magnitude 570, due to the large opening of the end portion. The interface of the vapor portion 550 and the liquid portion 560 can be at about the end portion of the release feature. For low flow 510, the action can be similar to a bubbling action, where gas can escape from the vapor portion 550 to the release feature 530.

In FIG. 5B, higher flow 515 can enlarge the oscillation magnitude 575, in which the liquid 565 can drop to a lower level, and the vapor portion 555 can rise to a higher level. Thus for a release feature having a flat end portion, a certain amount of flow can be used to achieve an oscillation of the liquid level, to generate a pumping action (FIG. 5C).

Figures 6A, 6B:
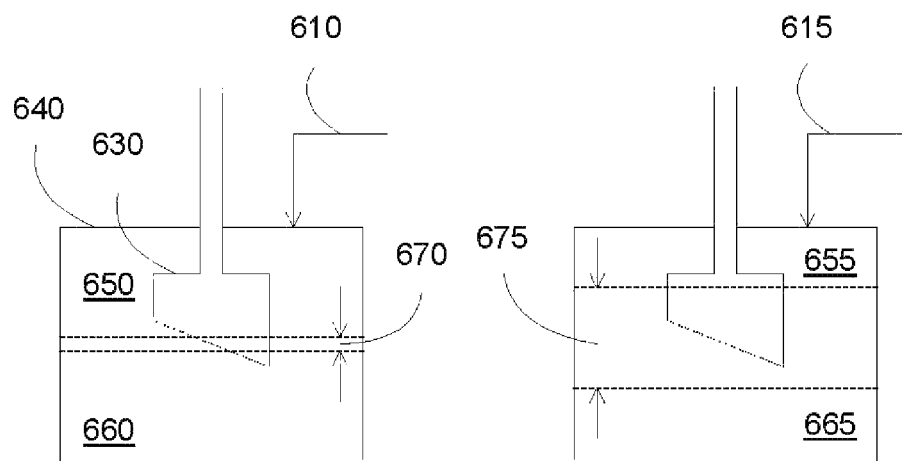
FIGS. 6A-6C illustrate behavior of an example of a release feature having a slanted end portion according to some embodiments of the present invention.
Figure 6C:
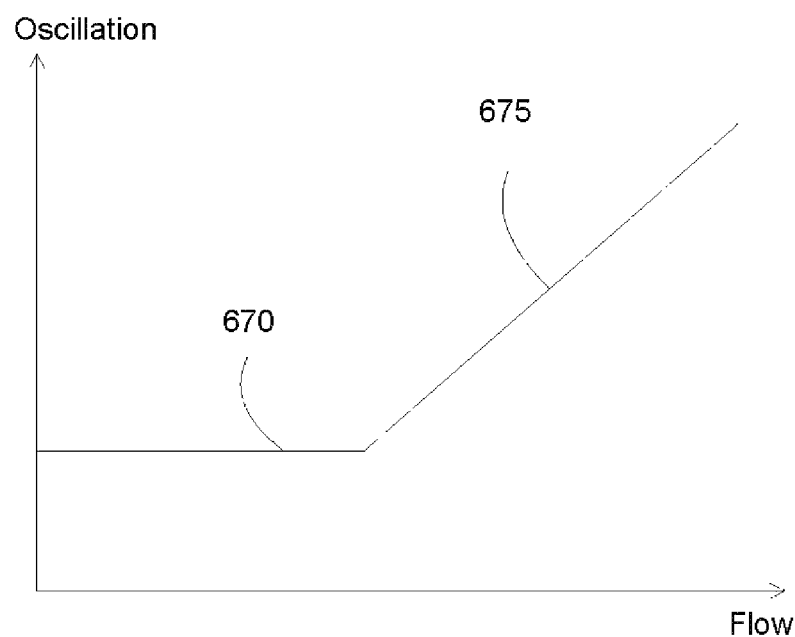

FIGS. 6A-6C illustrate behavior of an example of a release feature having a slanted end portion according to some embodiments of the present invention. In FIG. 6A, the release feature 630 can be disposed in a container 640. The end portion of the release feature 630 can be slanted, e.g., forming an angle with the level of the liquid 660. Since the opening is proportional to the liquid level, the window of operation can be enlarged for lower flow. For example, a low gas flow 610 can cause the liquid level to oscillate at the opening of the slanted end portion, having a medium oscillation magnitude 670. The interface of the vapor portion 650 and the liquid portion 660 can be between the slanted portion of the release feature.

In FIG. 6B, higher flow 615 can enlarge the oscillation magnitude 675, in which the liquid 665 can drop to a lower level, and the vapor portion 655 can rise to a higher level. Thus for a release feature having a slanted end portion, the operation curve can be shifted to the lower flow region, as compared to the flat end portion (FIG. 6C).

Figure 7A:
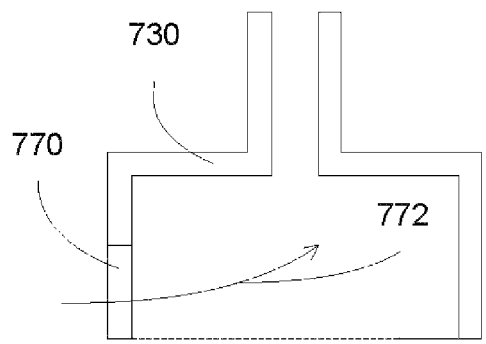
FIGS. 7A-7D illustrate examples of release feature walls according to some embodiments of the present invention.

In some embodiments, the present invention discloses shaping the walls of the release feature to control a flow of gas/liquid through the release feature. Straight flow or vortex flow can be achieved due to the shaping of the walls of the release feature FIGS. 7A-7D illustrate examples of release feature walls according to some embodiments of the present invention. The release features 730 and 735 can have a slanted end portion (as shown in FIG. 4C) or a slit end portion (as shown in FIGS. 4D and 4F). In FIGS. 7A and 7B, a release feature 730 has a slit end portion 770 with the walls of the slit cut substantially perpendicular to the slit opening. The design the slit 770 can create a flow along the walls, forming straight flow 772 from outside of the release feature to the inside of the release feature.

Figure 7C:
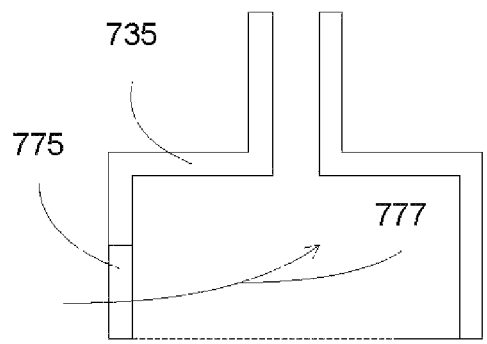
Figure 7B:
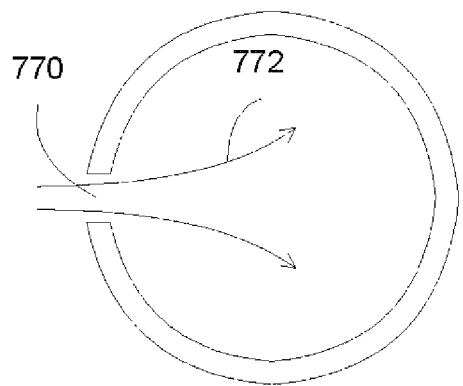
Figure 7D:
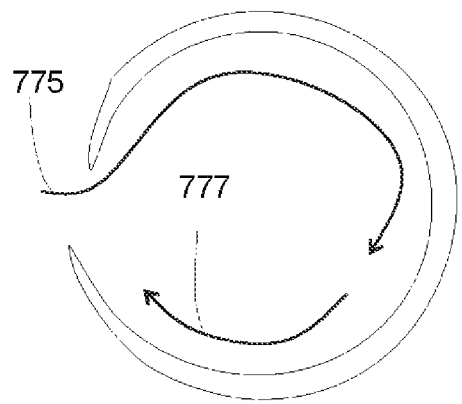

In FIGS. 7C and 7D, a release feature 735 has a slit end portion 775 with the walls of the slit cut substantially tangential to the slit opening. The design the slit 775 can also create a flow along the walls, forming vortex flow 777 along the tangent of the release feature. The vortex flow can generate higher mixing action of gas with liquid.

In some embodiments, the present invention discloses a gas pump which incorporates a release feature such as the released feature described above. The gas pump can include a housing having opening at one side of the housing. Disposed in the housing is a release feature, which is coupled to an outlet. An inlet can also be coupled to the housing.

Figure 8:
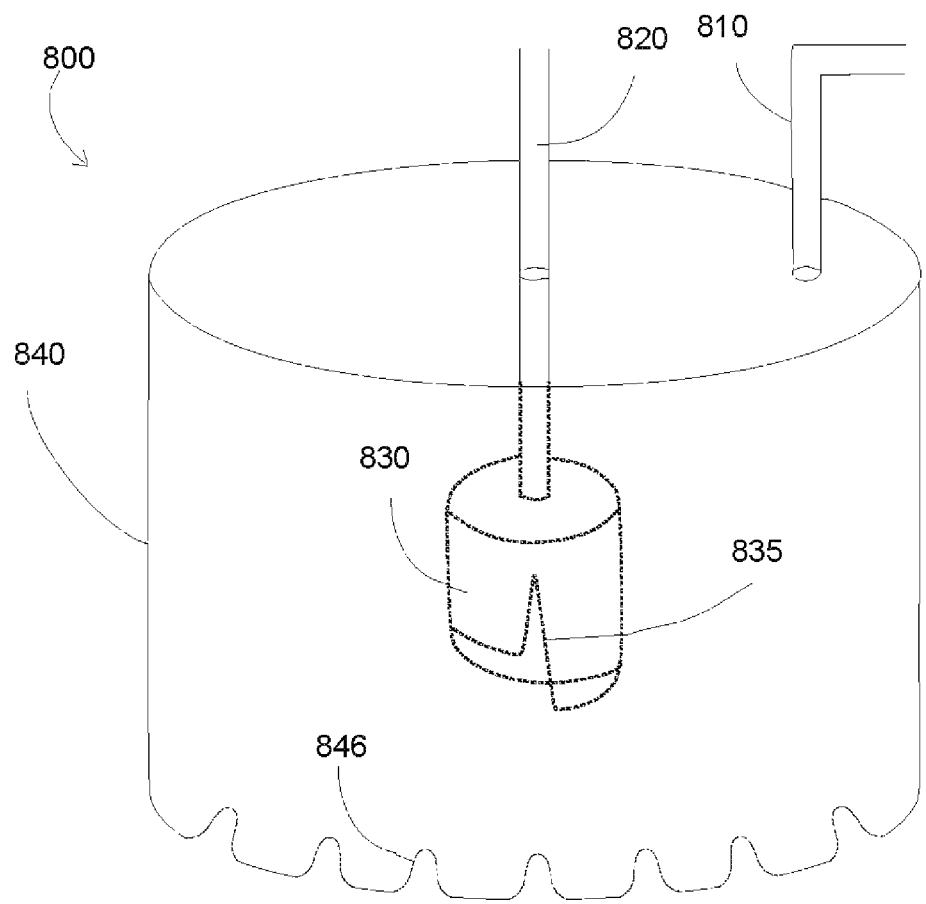
FIG. 8 illustrates a gas pump according to some embodiments of the present invention.

FIG. 8 illustrates a gas pump according to some embodiments of the present invention. A gas pump 800 can include a housing 840, which is hollow and has one or more openings 846. The housing can be positioned on the bottom of a liquid container, wherein the openings 846 allow a communication of liquid between the container and the interior of the housing. Disposed within the hollow interior of the housing 840 is a release feature 830, which is coupled to a conduit 820. The conduit 820 can function as a pump outlet, delivering a mixture of gas and liquid along the conduit. The release feature can include a release configuration 835, which permits an oscillation behavior of a liquid/gas interface, and which generates a pulse pumping action for pumping a mixture of gas and liquid to the conduit 820. A gas inlet 810 can be coupled to the hollow interior of the housing, for delivering a gas to the hollow interior. As shown, the gas inlet 810 is coupled to a top surface of the housing. Alternatively, the inlet can be coupled to a side surface, pass through or positioned near an opening to delivering gas to the hollow interior.

Figure 9:
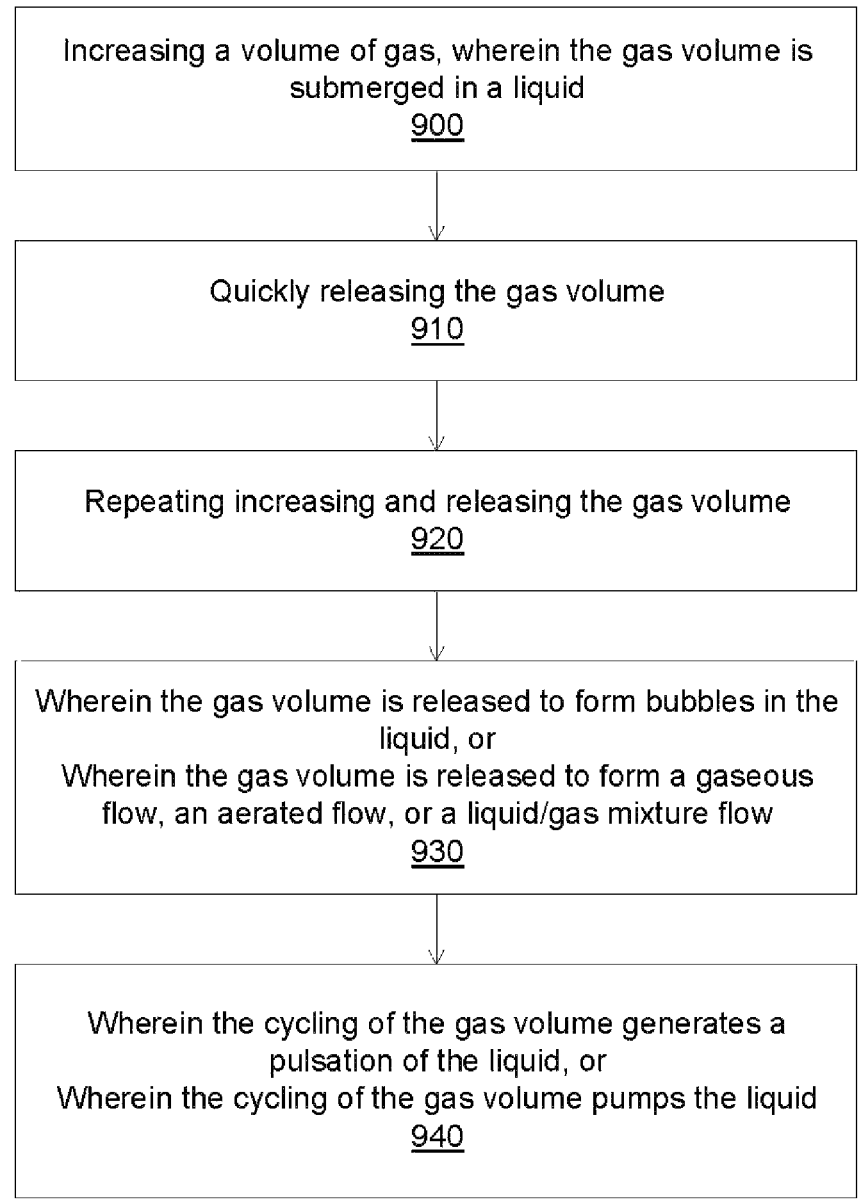
FIG. 9 illustrates a flowchart of an operation of a gas pump according to some embodiments of the present invention.
Figure 10:
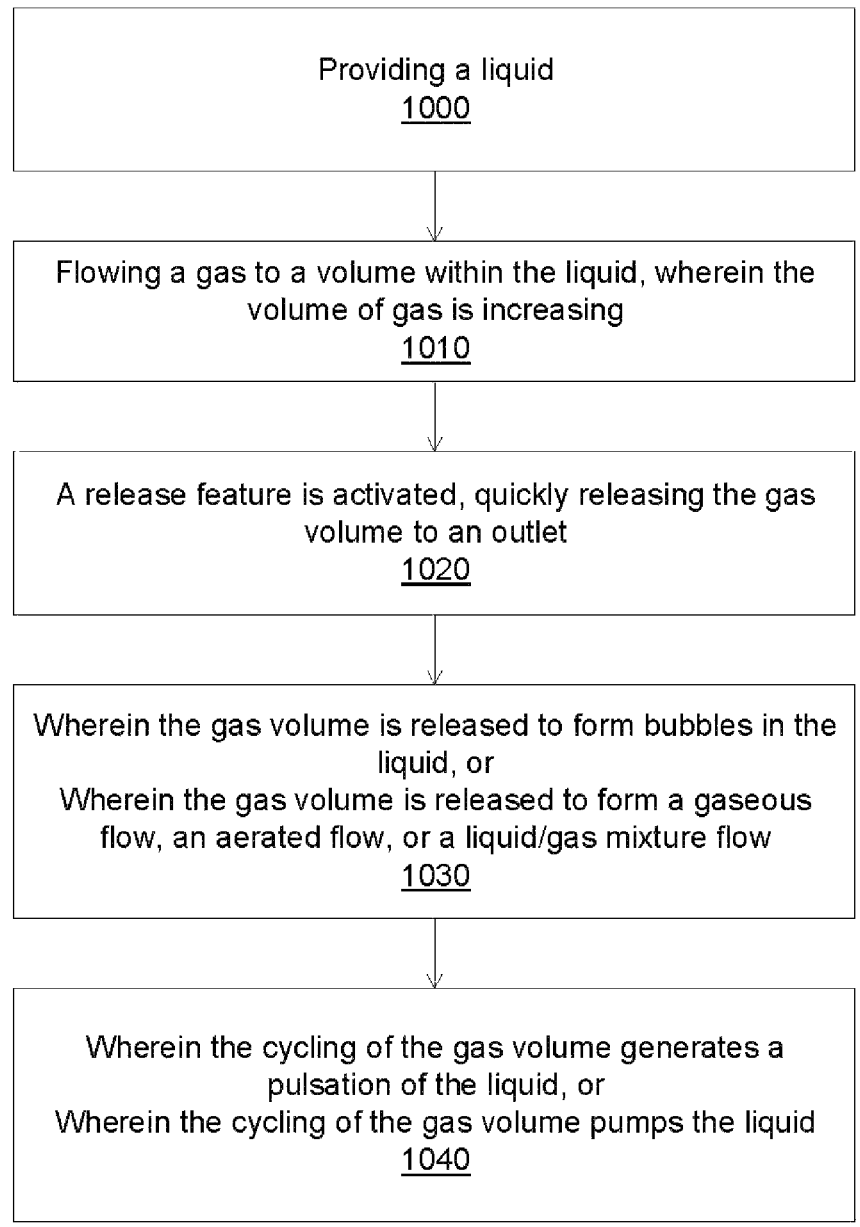
FIG. 10 illustrates a flowchart of an operation of a gas pump according to some embodiments of the present invention.

FIG. 9 illustrates a flowchart of an operation of a gas pump according to some embodiments of the present invention. In operation 900, a volume of gas in increased. The gas volume is submerged in a liquid, such as totally under a liquid surface. The gas increase can be linear, or can be non-linear. In operation 910, the gas volume is released. The gas volume can be released quickly, so that the liquid can be pumped to another location. In operation 920, the gas volume is repeated increased and decreased, so that the liquid can be pumped out. The liquid can be pumped out in a pulse mode, during the time of the gas volume reduction. In some embodiments, e.g., in operation 930, the gas volume is released to form bubbles in the liquid. For example, the liquid can be pumped from the pump to the outside area, and the gas can be released from the inside to the liquid. The gas can aerate the surrounding liquid, providing dissolving gas to the liquid. In some embodiments, the gas volume is released to form a flow, such as a gaseous flow, an aerated flow, or a mixture of gas and liquid flow. For example, a mixture of liquid and gas can be pumped from the liquid to another location outside of the liquid area. With the gas pressure, the liquid can be pumped farther or at high flow rate as compared to a conventional pump. In some embodiments, e.g., in operation 940, the gas volume is cycled, e.g., expanded and contracted. The cycling of the gas volume can generate a pulsation or an agitation of the liquid near the housing of the pump. In addition, the cycling of the gas volume can act to pump the liquid out of the pump housing FIG. 10 illustrates another flowchart of an operation of a gas pump according to some embodiments of the present invention. In operation 1000, a liquid is provided, for example, within a container. In operation 1010, a gas is flowed to a volume within the liquid. The volume can increase, due to the addition of gas by the gas flow. In operation 1020, a release feature can be activated, for example, when the gas volume reaches a certain size. When the release feature is activated, the gas volume is released to an outlet. The release of the gas volume can occur quickly, pulling a portion of the surrounding liquid to the outlet. In operation 1030, the gas volume is released to the surrounding liquid, thus forming bubbles in the liquid. Alternatively, gas and liquid can be mixed, and a gaseous flow, an aerated flow or a mixture flow can be formed, flowing out to the surrounding liquid, or to any other location. In operation 1040, the gas volume can repeatedly expand and contract, forming a cycling action of the surrounding liquid. The cycling action can pump the liquid, together with the release of gas, from the liquid container.

In some embodiments, the present invention discloses a gas pump system, and method to operate the gas pump system, which can have a fixed volume. The gas pump can include a fixed solid wall, thus the interior volume of the pump is constant. An inlet can be provided to flow gas into the fixed volume, thus can increase the gas pressure in the volume. A release feature can be coupled to the fixed volume, which can release the gas within the volume to the outside area. The release of the gas pressure and volume can form a gas flow. The release feature can be coupled to an outlet, which can have communication with a surrounding liquid. The gas flow thus can pull liquid to the outlet, forming a mixture of gas and liquid flow. The mixture flow can be released to the liquid, forming bubbles. The mixture flow can be used to pump the liquid to another location. The gas pressure can repeatedly increase and decrease, forming a pulsing action for pumping the liquid in a pulse mode.

Figure 11:
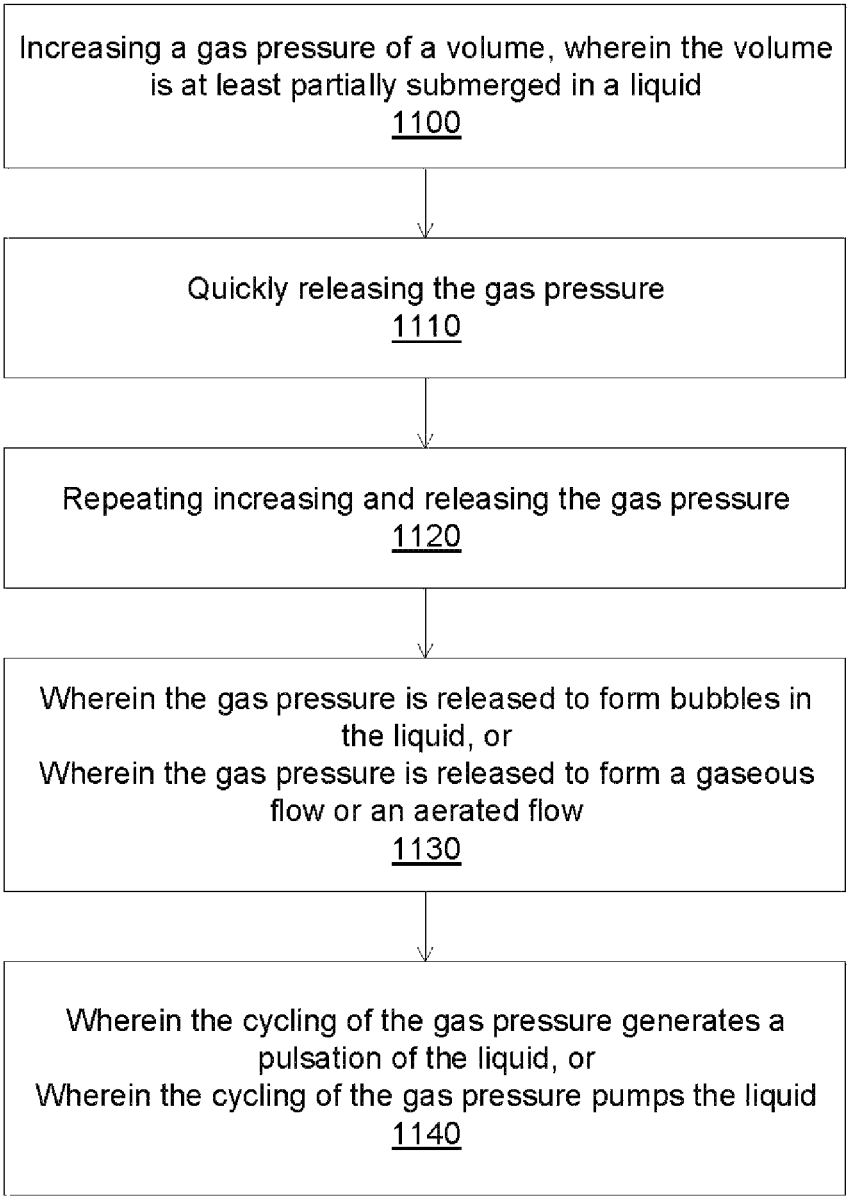
FIG. 11 illustrates a flowchart of an operation of a gas pump according to some embodiments of the present invention.

FIG. 11 illustrates a flowchart of an operation of a gas pump according to some embodiments of the present invention. In operation 1100, a gas pressure in a volume in increased. The gas volume can be submerged in a liquid, such as totally under a liquid surface. In operation 1110, the gas pressure is released. The gas pressure can be released quickly, so that the liquid can be pumped to another location. In operation 1120, the gas pressure is repeated increased and decreased, so that the liquid can be pumped out. The liquid can be pumped out in a pulse mode, during the time of the gas pressure reduction. In some embodiments, e.g., in operation 1130, the gas pressure is released to form bubbles in the liquid. For example, the liquid can be pumped from the pump to the outside area, and the gas can be released from the inside to the liquid. The gas can aerate the surrounding liquid, providing dissolving gas to the liquid. In some embodiments, the gas pressure is released to form a flow, such as a gaseous flow, an aerated flow, or a mixture of gas and liquid flow. For example, a mixture of liquid and gas can be pumped from the liquid to another location outside of the liquid area. In operation 1140, the gas pressure can repeatedly expand and contract, forming a cycling action of the surrounding liquid. The cycling action can pump the liquid, together with the release of gas, from the liquid container.

Figure 12:
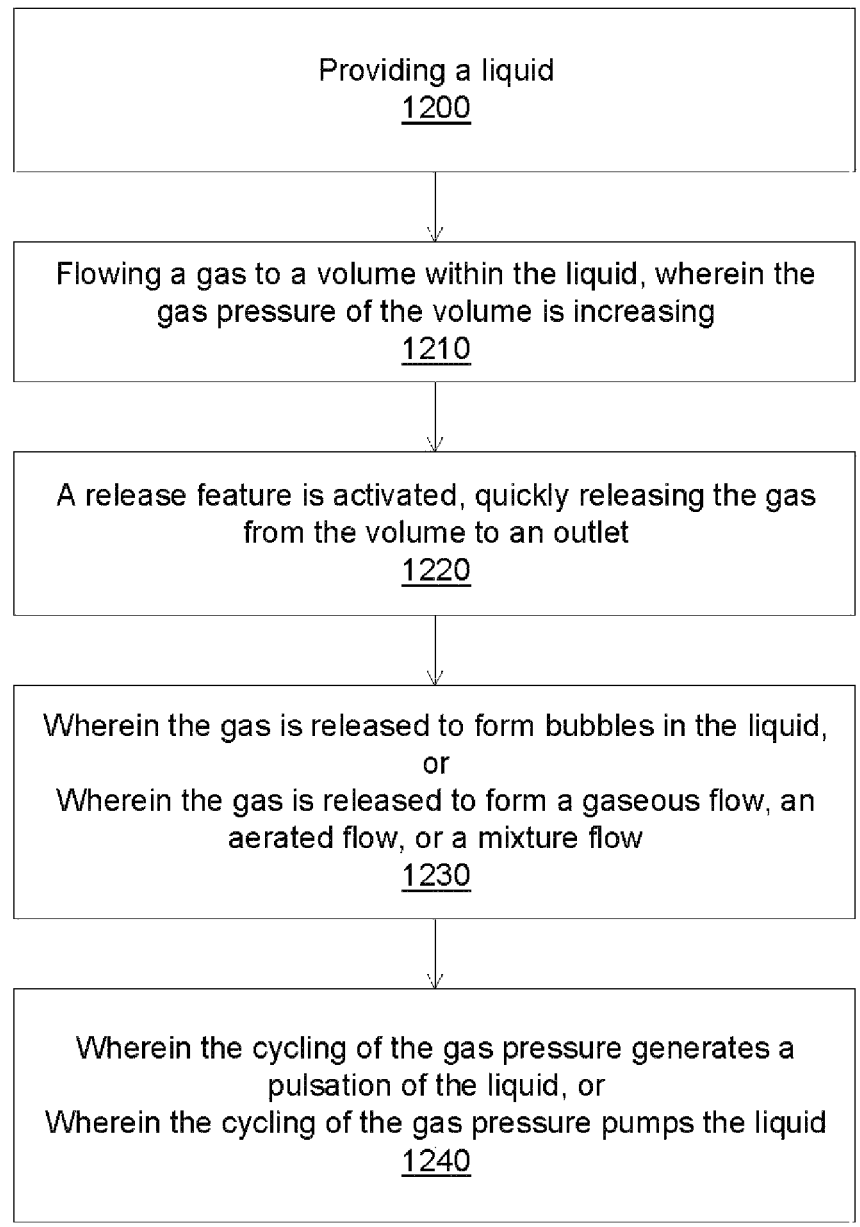
FIG. 12 illustrates a flowchart of an operation of a gas pump according to some embodiments of the present invention.

FIG. 12 illustrates another flowchart of an operation of a gas pump according to some embodiments of the present invention. In operation 1200, a liquid is provided, for example, within a container. In operation 1210, a gas is flowed to a volume within the liquid. The pressure can increase, due to the addition of gas by the gas flow. In operation 1220, a release feature can be activated, for example, when the gas pressure reaches a certain value.

When the release feature is activated, the gas pressure is released to an outlet. The release of the gas pressure can occur quickly, pulling a portion of the surrounding liquid to the outlet. In operation 1230, the gas pressure is released to the surrounding liquid, thus forming bubbles in the liquid. Alternatively, gas and liquid can be mixed, and a gaseous flow, an aerated flow or a mixture flow can be formed, flowing out to the surrounding liquid, or to any other location. In operation 1240, the gas pressure can repeatedly expand and contract, forming a cycling action of the surrounding liquid. The cycling action can pump the liquid, together with the release of gas, from the liquid container.

Figure 13:
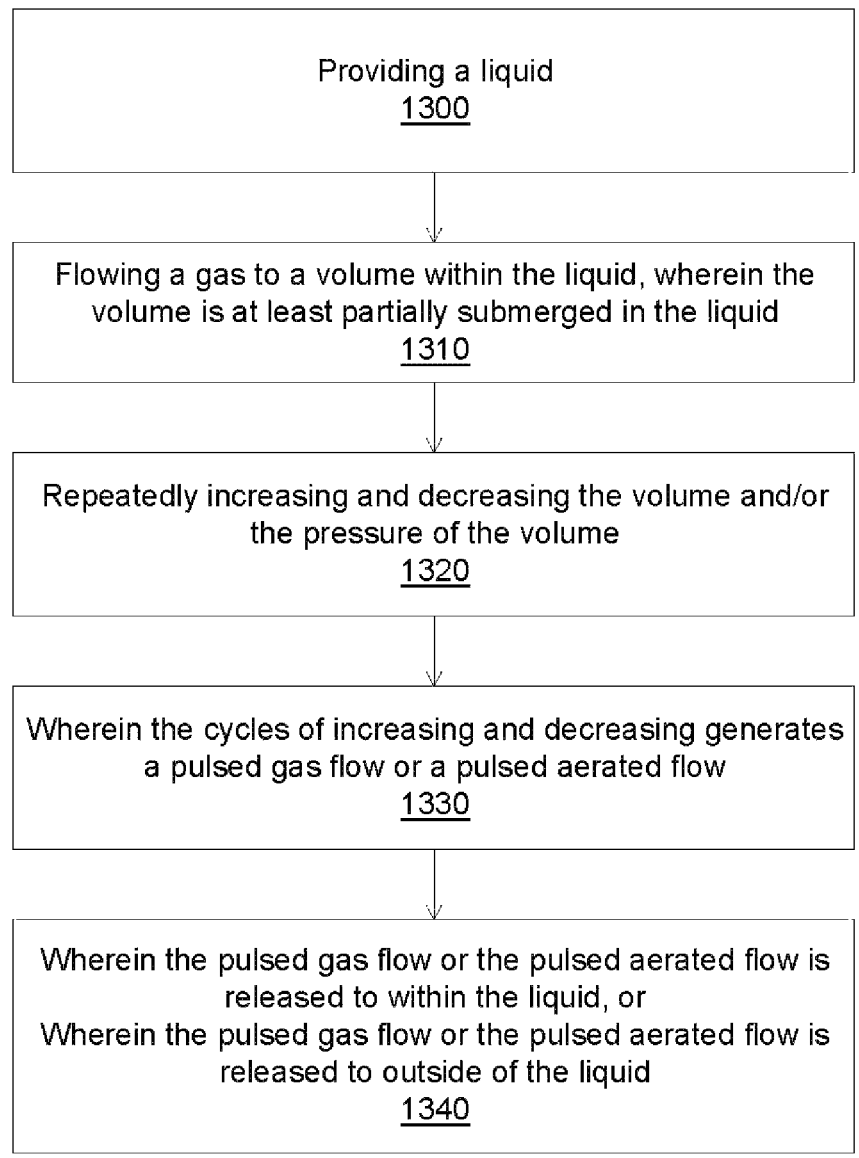
FIG. 13 illustrates a flowchart of an operation of a gas pump according to some embodiments of the present invention.

FIG. 13 illustrates another flowchart of an operation of a gas pump according to some embodiments of the present invention. In operation 1300, a liquid is provided, for example, within a container. In operation 1310, a gas is flowed to a volume within the liquid. In operation 1320, the volume and/or the pressure can increase and decrease, due to the addition and release of gas. In operation 1330, the cycling action generates a pulsed gas flow or a mixture flow. In operation 1340, the flow can be released to the liquid or to pump out to another location.

In some embodiments, the gas flow can be provided by an air pump. The air pump can be powered by a solar panel or a wind mill, providing a self-sustained system.

Figure 14A:
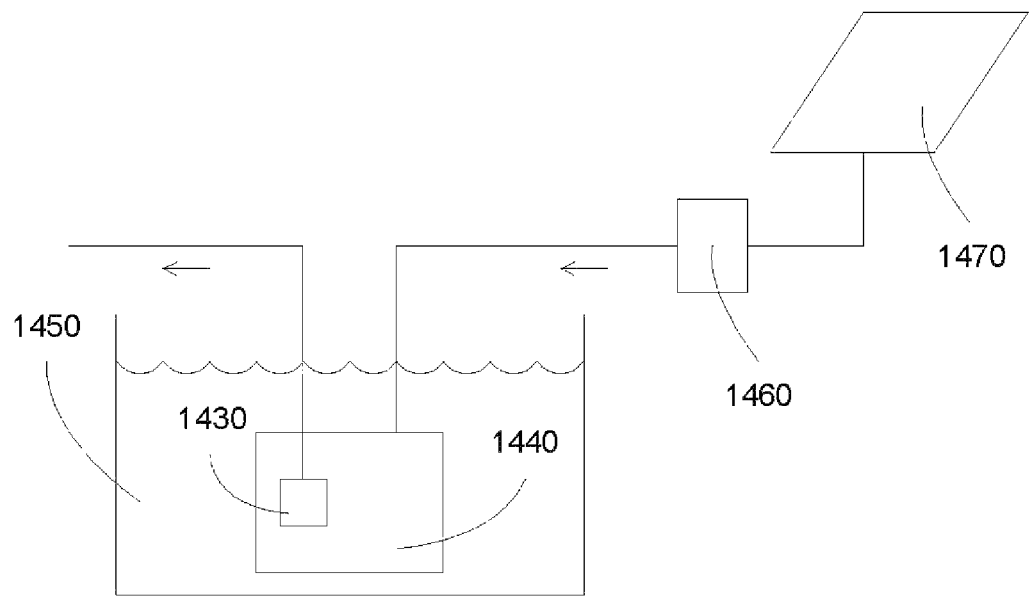
FIGS. 14A-14B illustrate examples of a self-sustained system according to some embodiments of the present invention.
Figure 14B:
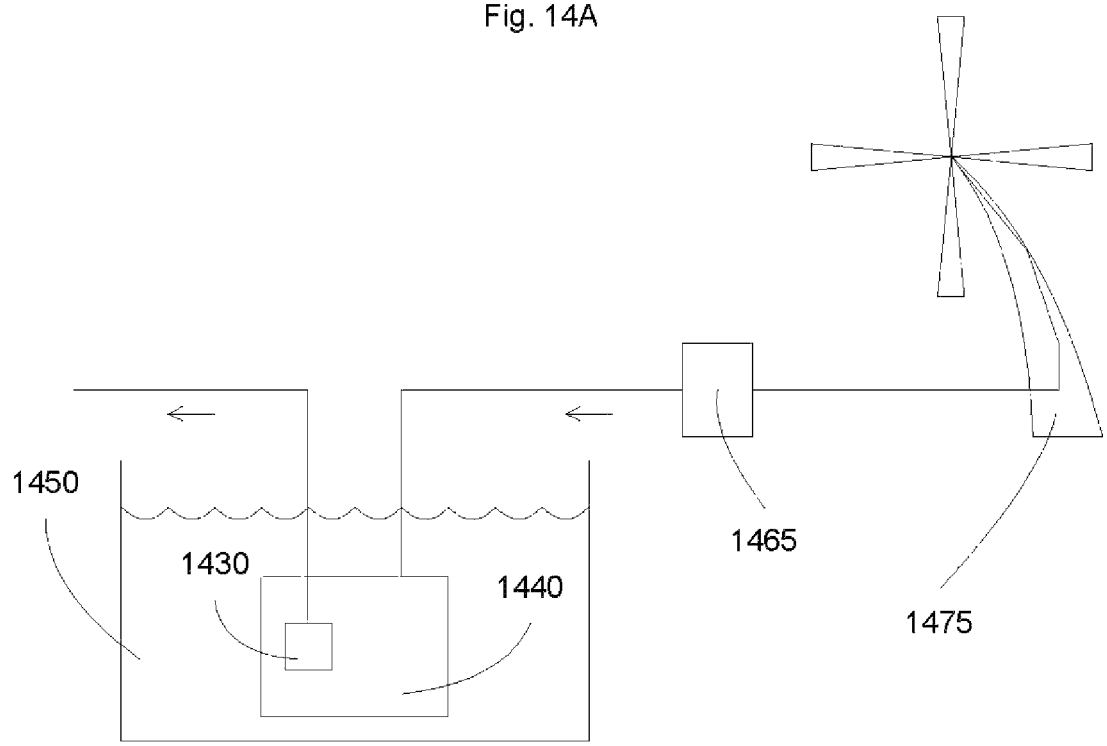

FIGS. 14A-14B illustrate examples of a self-sustained system according to some embodiments of the present invention. In FIG. 14A, solar power can be used to power the gas pump. Solar panels 1470 can provide power to flow generator 1460, which can provide gas flow to a gas pump 1440. The gas pump 1440 can be submerged in a liquid 1450. A release feature 1430 can pump the liquid 1450, either to another location or directly to surrounding liquid. The gas pump may only need a small amount of power and a small amount of gas flow, since the gas can be accumulated, until having enough power to push the liquid. Similarly, in FIG. 14B, a windmill 1475 can provide air flow or power to operate a flow generator 1465 to power the gas pump 1440. Other power or air generators can also be used, including a combination of solar and wind.

In some embodiments, the present invention discloses a liquid treatment including an aeration process and system, which includes a pulsed pump powered by a gas flow. A pulsed pump having a gas volume can be disposed in a liquid. By repeating increasing and decreasing the gas volume or a gas pressure of the gas volume, a pulsed gas flow can be generated in the liquid. The pulsed gas flow can be released to the liquid, for example, through a porous element to regulate the bubble formation and flow. The released gas flow can aerated the liquid in a pulse mode. In addition, the pulsing action can agitate the liquid, further contributing to the treatment of the liquid.

Figure 15:
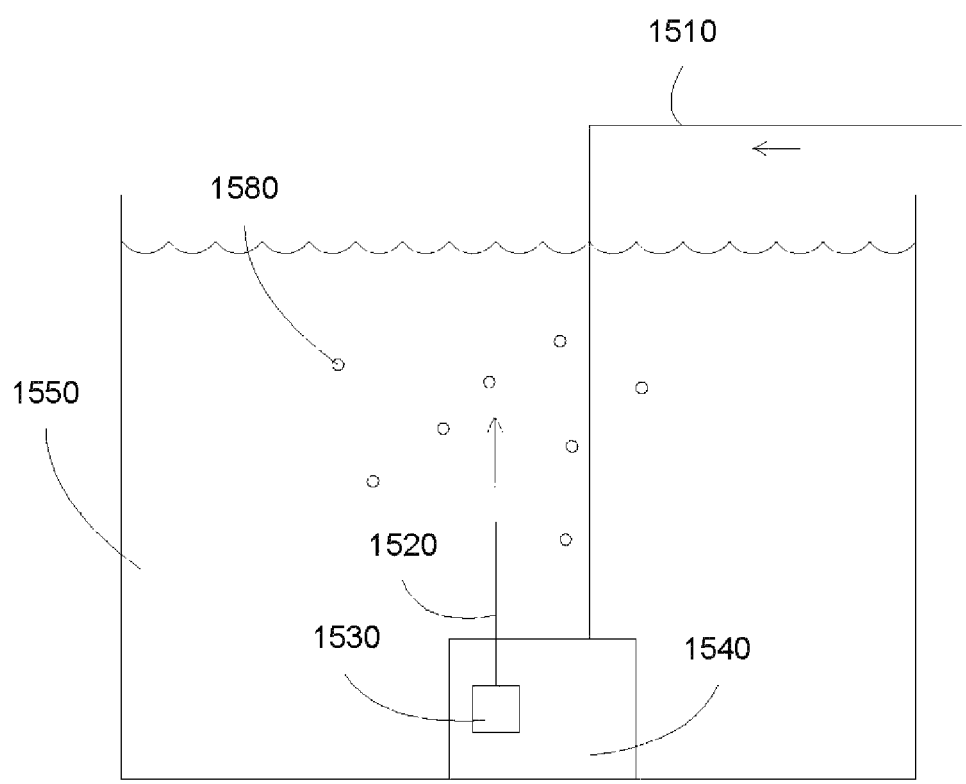
FIG. 15 illustrates an aeration system according to some embodiments of the present invention.

FIG. 15 illustrates an aeration system according to some embodiments of the present invention. A gas pump 1540 is disposed in a liquid 1550. Gas flow 1510, such as air flow, can be provided to the gas pump and a mixture of liquid and gas can be released at outlet 1520, for example, in pulse mode due to the release feature 1530. The mixture flow can aerate the liquid 1550, e.g., having bubbles 1580 that can be dissolved in the liquid. An optional porous element can be included to regulate the bubbles at the outlet flow.

Figure 16:
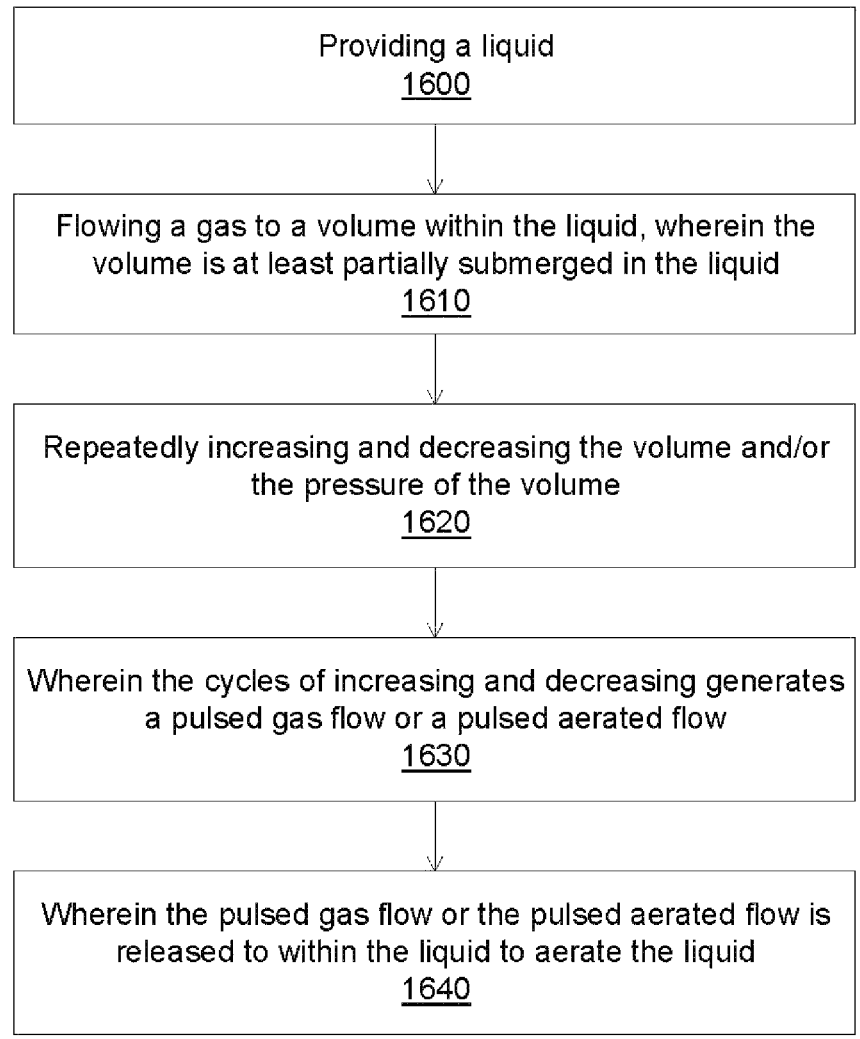
FIG. 16 illustrates a flowchart of an aeration process according to some embodiments of the present invention.

FIG. 16 illustrates a flowchart for an aeration process according to some embodiments of the present invention. In operation 1600, a liquid is provided, for example, in a container such as a fish tank. In operation 1610, a gas, such as air, can be flown to a volume within the liquid. The volume can be submerged in the liquid. In operation 1620, the volume and/or the pressure of the volume can be repeatedly increased and decreased, for example, due to a release feature disposed in the volume. In operation 1630, the volume or pressure cycling can generate a pulsed gas flow, an aerated gas flow, or a mixture flow of gas and liquid. In operation 1640, the pulsed flow is released to the surrounding liquid, for example, to aerate the liquid.

In some embodiments, the present invention discloses a liquid pumping process and system, which includes a pulsed pump powered by a gas flow. A pulsed pump having a gas volume can be disposed in a liquid. The repeating action of pulsing the gas volume or a gas pressure of the gas volume can generate an aerated liquid flow. The pulsed aerated liquid flow can be pumped out of the liquid, for example, to a container. The pumped liquid can include an aerated flow, provided to the container in a pulse mode.

Figure 17:
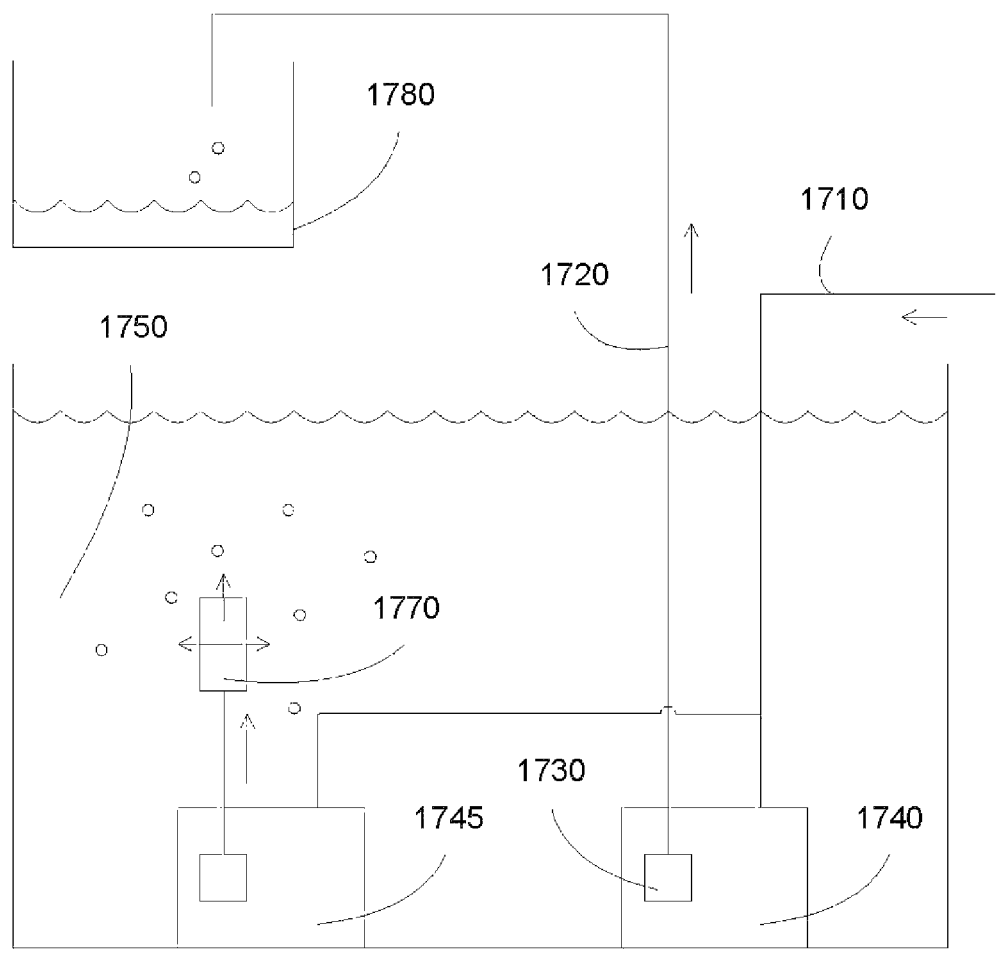
FIG. 17 illustrates a liquid pumping system according to some embodiments of the present invention.

FIG. 17 illustrates a liquid pumping system according to some embodiments of the present invention. A gas pump 1740 is disposed in a liquid 1750. Gas flow 1710, such as air flow, can be provided to the gas pump and a mixture of liquid and gas can be pumped at outlet 1720, for example, in pulse mode due to the release feature 1730. The mixture flow can be provided to another container 1780, effectively pumping the liquid from one location to another location. Additional aeration of the liquid 1750 can also be included, such as another gas pump 1745 providing a bubble flow through a porous element 1770.

Figure 18:
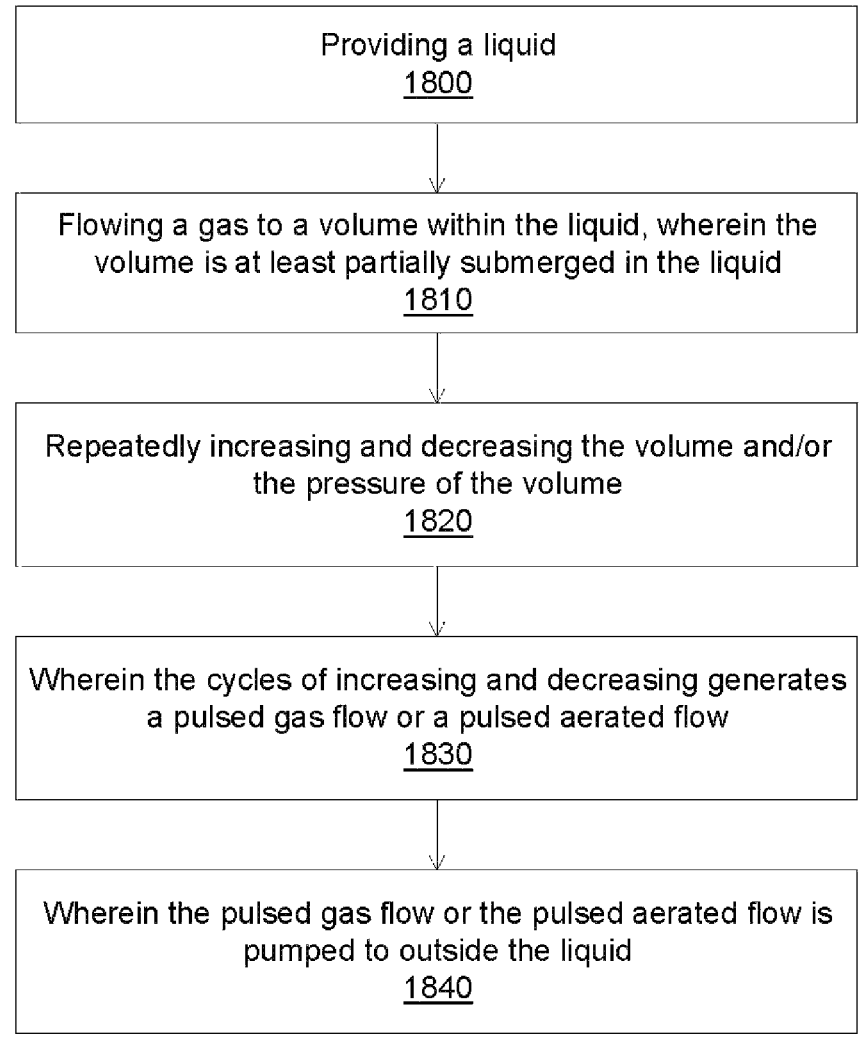
FIG. 18 illustrates a flowchart for a liquid pumping process according to some embodiments of the present invention.

FIG. 18 illustrates a flowchart for a liquid pumping process according to some embodiments of the present invention. In operation 1800, a liquid is provided, for example, in a container such as a fish tank. In operation 1810, a gas, such as air, can be flown to a volume within the liquid. The volume can be submerged in the liquid. In operation 1820, the volume and/or the pressure of the volume can be repeatedly increased and decreased, for example, due to a release feature disposed in the volume. In operation 1830, the volume or pressure cycling can generate a pulsed gas flow, an aerated gas flow, or a mixture flow of gas and liquid. In operation 1840, the pulsed flow is pumped to another location, such as another container.

In some embodiments, the present invention discloses a liquid treatment including a liquid filtering process and system, which includes a pulsed pump powered by a gas flow. A pulsed pump having a gas volume can be disposed in a liquid. The repeating action of pulsing the gas volume or a gas pressure of the gas volume can generate an aerated liquid flow. The aerated flow can be filtered and then returned to the liquid. In addition, the pulsed flow can also be released to the liquid to aerating the liquid. In addition, the pulsing action can agitate the liquid, further contributing to the treatment of the liquid.

Figure 19:
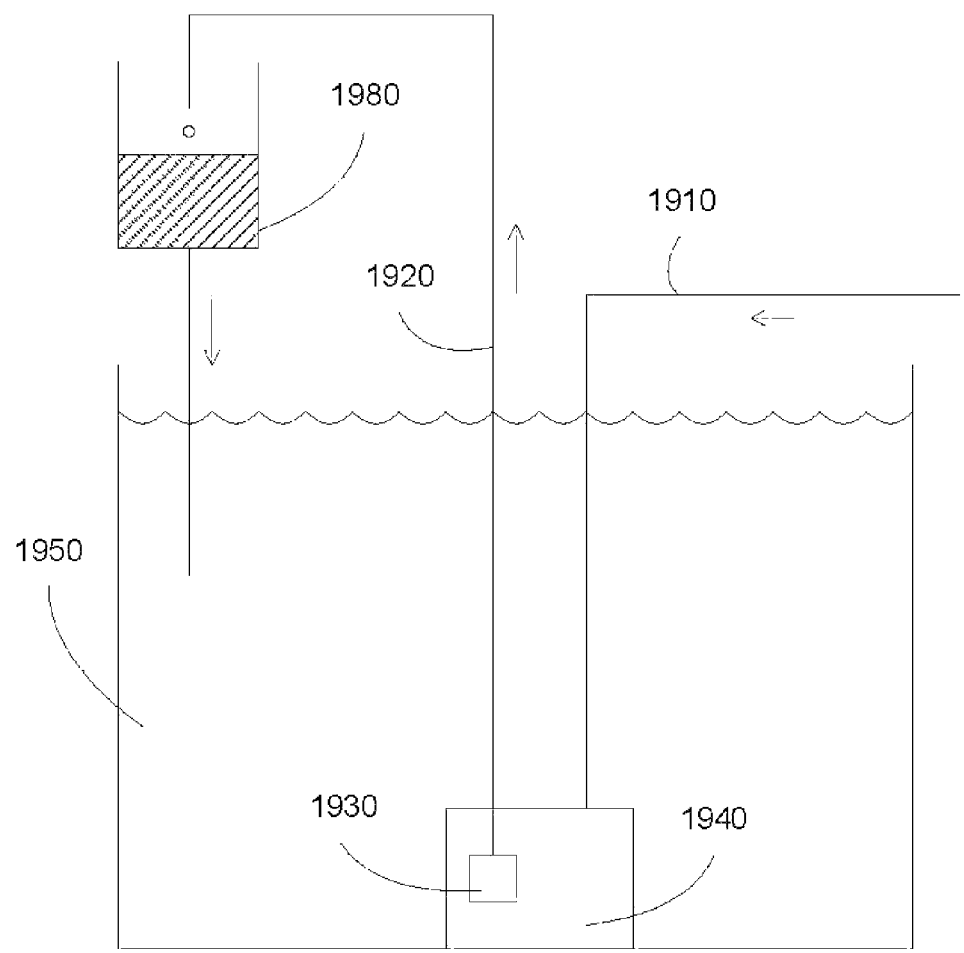
FIG. 19 illustrates a liquid filtering system according to some embodiments of the present invention.

FIG. 19 illustrates a liquid filtering system according to some embodiments of the present invention. A gas pump 1940 is disposed in a liquid 1950. Gas flow 1910, such as air flow, can be provided to the gas pump and a mixture of liquid and gas can be pumped at outlet 1920, for example, in pulse mode due to the release feature 1930. The mixture flow can be provided to a filter 1980 before returning to the container, effectively filtering the liquid. Additional aeration of the liquid can also be included, such as another gas pump providing a bubble flow.

Figure 20:
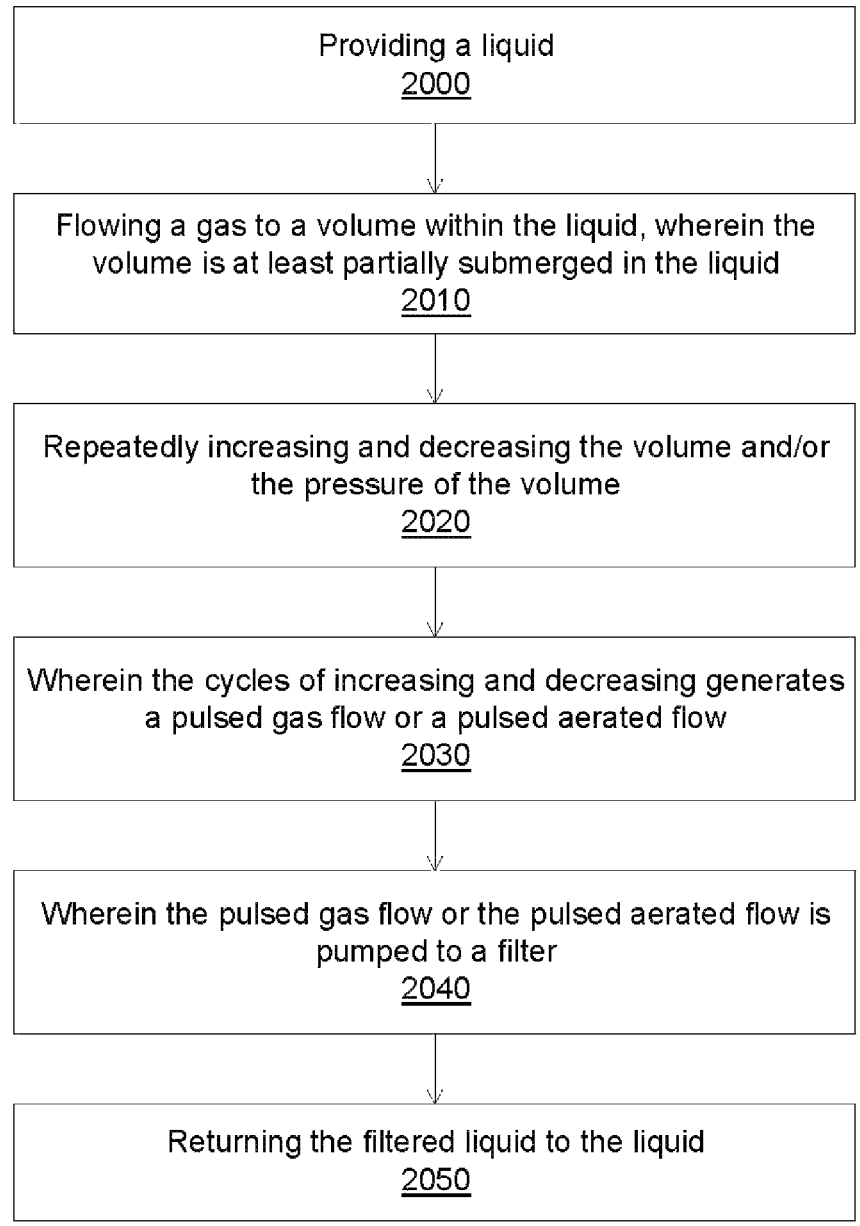
FIG. 20 illustrates a flowchart for a liquid filtering system according to some embodiments of the present invention.

FIG. 20 illustrates a flowchart for a liquid filtering process according to some embodiments of the present invention. In operation 2000, a liquid is provided, for example, in a container such as a fish tank. In operation 2010, a gas, such as air, can be flown to a volume within the liquid. The volume can be submerged in the liquid. In operation 2020, the volume and/or the pressure of the volume can be repeatedly increased and decreased, for example, due to a release feature disposed in the volume. In operation 2030, the volume or pressure cycling can generate a pulsed gas flow, an aerated gas flow, or a mixture flow of gas and liquid. In operation 2040, the pulsed flow is pumped to a filter. In operation 2050, the filtered liquid is returned to the liquid.

In some embodiments, the present invention discloses an aquaponic process and system, which includes a pulsed pump powered by a gas flow. A pulsed pump having a gas volume can be disposed in a fish tank. The repeating action of pulsing the gas volume or a gas pressure of the gas volume can generate an aerated liquid flow. The aerated flow can be used to water plants in a plant bed, which then can be returned to the fish tank.

Figure 21:
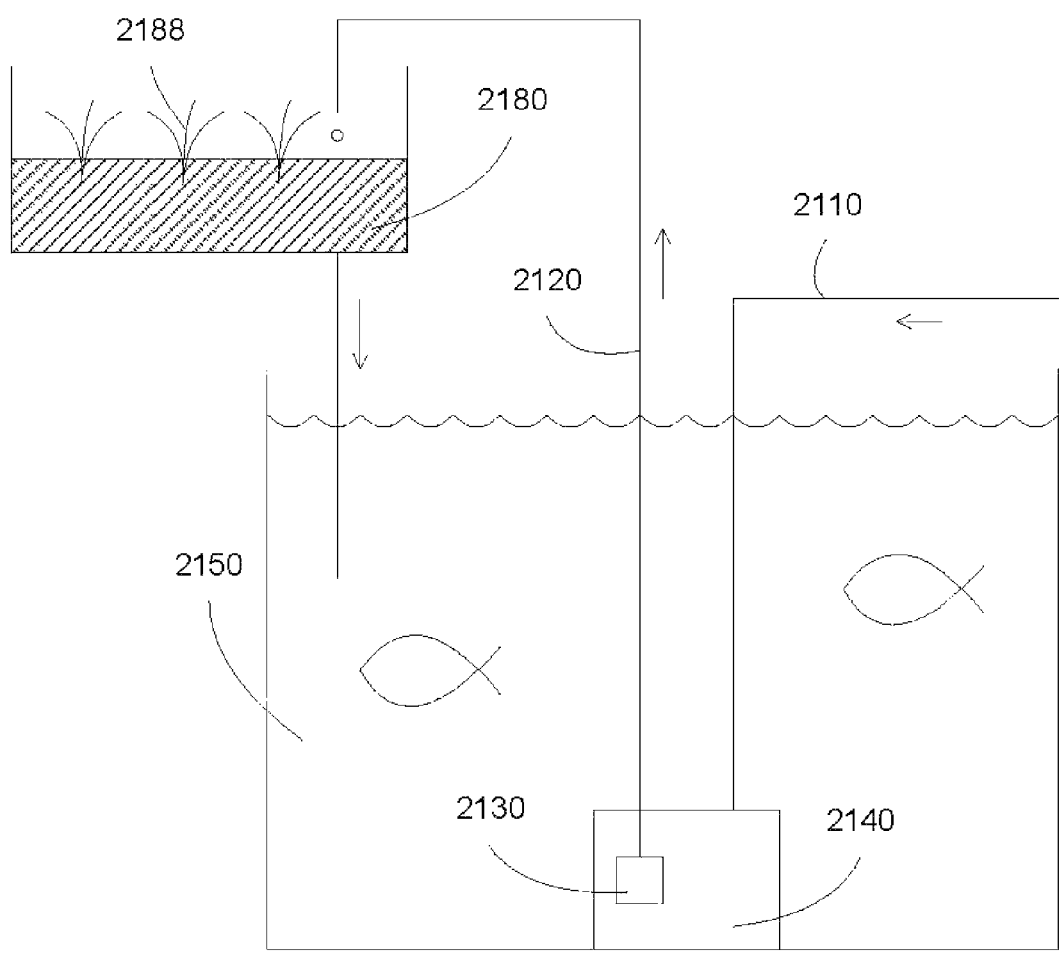
FIG. 21 illustrates an aquaponic system to some embodiments of the present invention.

FIG. 21 illustrates an aquaponic system according to some embodiments of the present invention. A gas pump 2140 is disposed in a fish tank 2150. Gas flow 2110, such as air flow, can be provided to the gas pump and a mixture of liquid and gas can be pumped at outlet 2120, for example, in pulse mode due to the release feature 2130. The mixture flow can be provided to a plant bed 2180, effectively pumping the liquid from the fish tank 2150 to water the plant 2188. The liquid can be returned to the fish tank. Additional aeration of the fish tank can also be included, such as another gas pump providing a bubble flow through a porous element.

Figure 22:
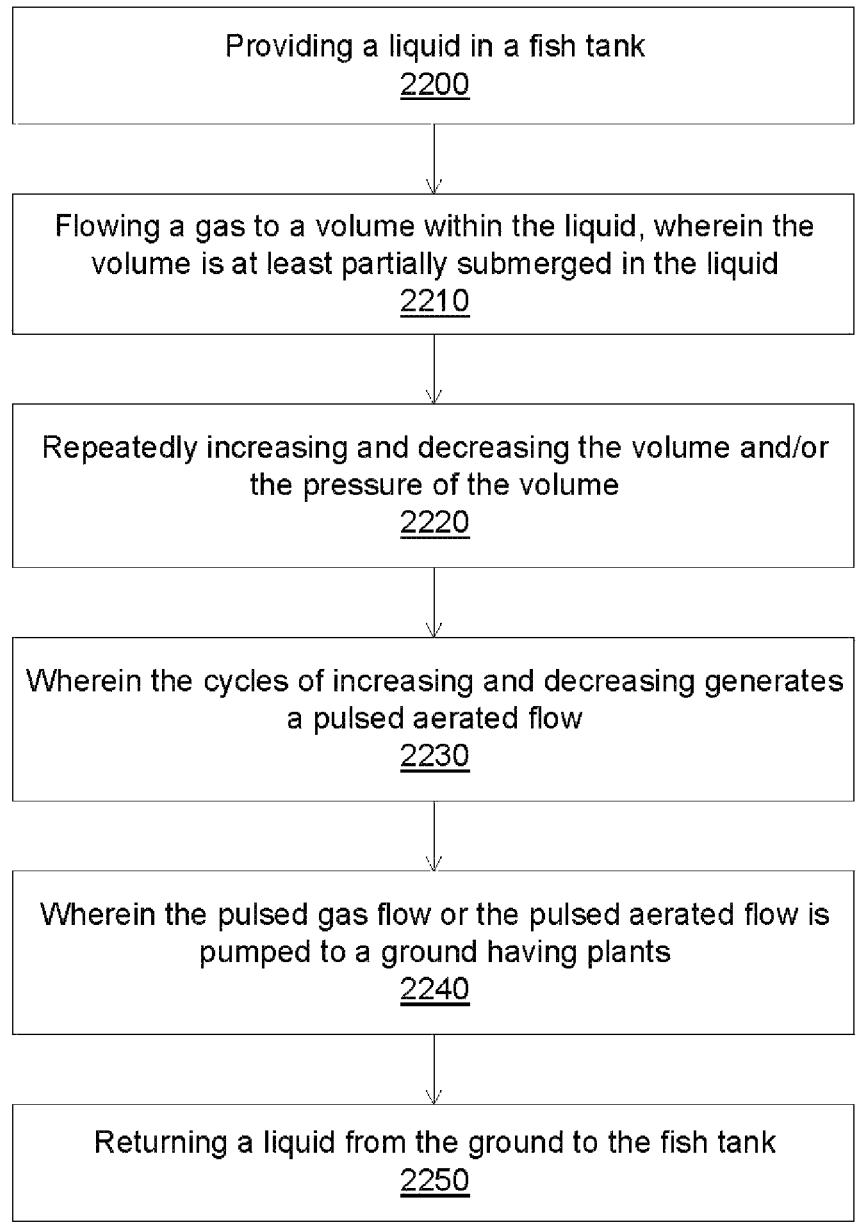
FIG. 22 illustrates a flowchart for an aquaponic system according to some embodiments of the present invention.

FIG. 22 illustrates a flowchart for an aquaponic system according to some embodiments of the present invention. In operation 2200, a liquid is provided, for example, in a container such as a fish tank. In operation 2210, a gas, such as air, can be flown to a volume within the liquid. The volume can be submerged in the liquid. In operation 2220, the volume and/or the pressure of the volume can be repeatedly increased and decreased, for example, due to a release feature disposed in the volume. In operation 2230, the volume or pressure cycling can generate a pulsed gas flow, an aerated gas flow, or a mixture flow of gas and liquid. In operation 2240, the pulsed flow is pumped to a ground having plants. In operation 2250, the liquid from the ground is returned to the fish tank.

FIGS. 23A-23F illustrate a release feature of a vortex aerated pump according to some embodiments of the present invention. FIGS. 23A-D show various perspective views of the vortex aerated pump. The vortex aerated pump 2310 can have multiple cuts 2320/2330 with a slope curve 2340/2350 at two ends of the cuts. The slope curve, which can also be described as a flap or wing, and the relationship between each slope curve and corresponding cut, is critical for creating a vortex aerated flow.

Figure 23A:
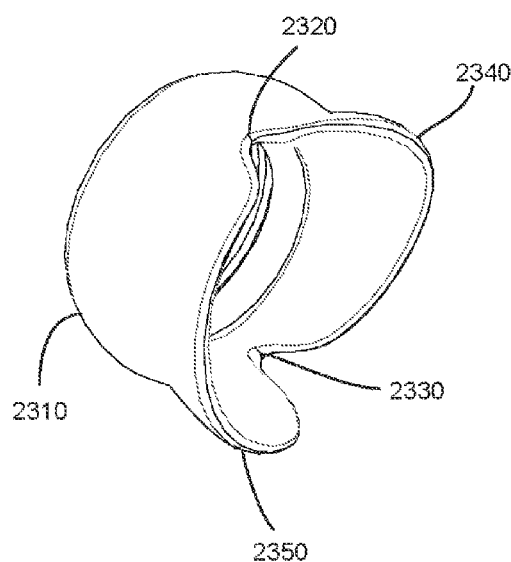
FIGS. 23A-23F illustrate a release feature of a vortex aerated pump according to some embodiments of the present invention.
Figure 23B:
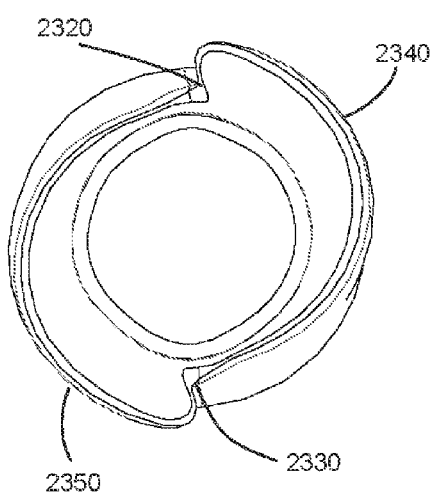
Figure 23C:
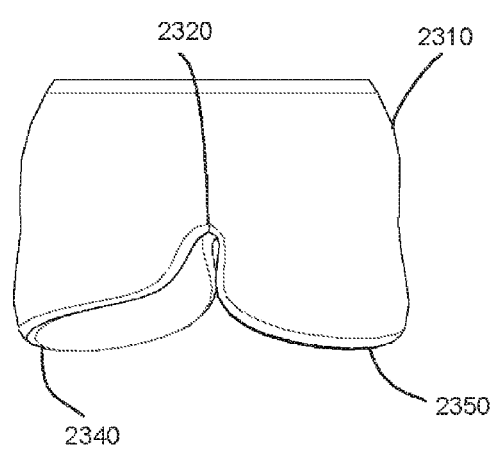
Figure 23D:
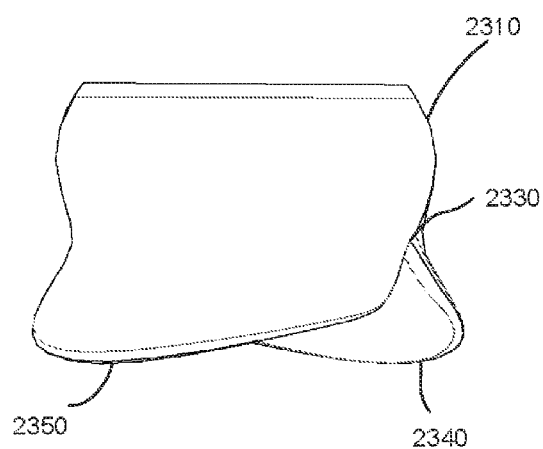
Figure 23E:
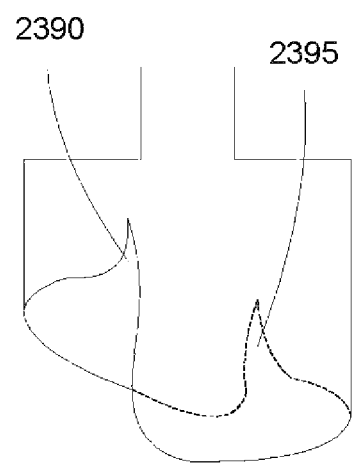
Figure 23F:
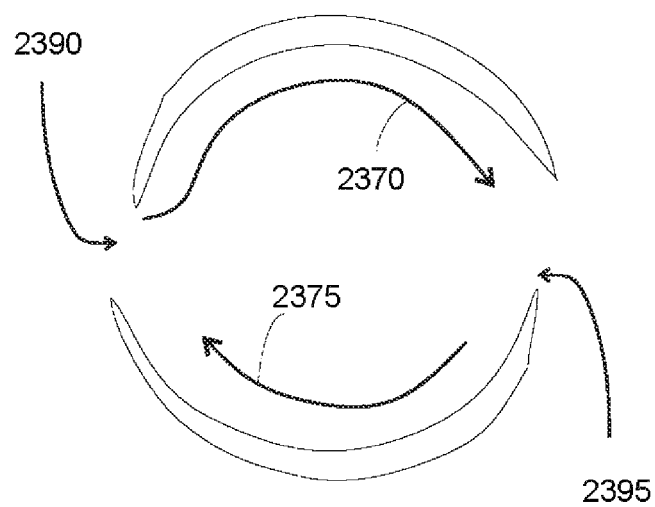

FIG. 23E shows a cross section view and FIG. 31F shows a bottom view. The vortex aerated pump can have multiple cuts 2390/2395 with a slope at two ends of the cuts. The slope curve with the cut can regulate the oscillation behavior of the liquid/gas movement, together with forming turbulence due to rotating action of the liquid at the spiral interface. The multiple cuts can assist in improving the vortex flow.

The release feature 2390/2395 has a slit end portion with the walls of the slit cut substantially tangential to the slit opening. The design the slit can also create a flow along the walls, forming vortex flow 2370/2375 along the tangent of the release feature. The vortex flow can generate higher mixing action of gas with liquid.

As shown, there are two split cuts at the vortex aerated pump. Other numbers of split cuts can be used, such as greater than 2, such as 3 or 4, depending on the size of the tube. For example, a split cut can be provided at 1 or 2 inch separation along the periphery of the tube.

In some embodiments, the present invention discloses a liquid treatment including aerating and/or filtering the liquid using a vortex aerated pump. The vortex aerated pump can include a pulsed pump powered by a gas flow. The aerated liquid, pumped from the vortex aerated pump, can be released to the liquid, either directly or through a porous element, to generate oxygen in the liquid. The vortex aerated pump can generate liquid movement through the vortex flow through the pump, either at the outlet flow of the pump or at the inlet of the pump. The aerated liquid, pumped from the vortex aerated pump, can be filtered, and then returned. The vortex aerated pump can generate liquid movement through the vortex flow through the pump, at the inlet of the pump, e.g., at the split cut at the release feature of the vortex aerated pump.

In some embodiments, the vortex aerated pump can be used for swimming pools. The aerated action, liquid movement, and optional filtering can clean the liquid in the swimming pool, including preventing bacteria, algae and virus. For example, the aerated action can incorporate oxygen to the liquid, replacing $CO_2$, thus providing a clean liquid and starving bacteria and algae which consume $CO_2$. Further, the liquid movement, in the form of vortex flow, generated by the vortex aerated pump, can effectively stir the liquid with minimum stagnant areas, thus further reducing bacteria and algae growth. The filtering action can remove particulates.

In some embodiments, the vortex aerated pump can keep the liquid in the swimming pool clean, without using any chemical such as chlorine. In some embodiments, the vortex aerated pump can reduce calcium deposit, for example, by circulating the liquid.

Figure 24:
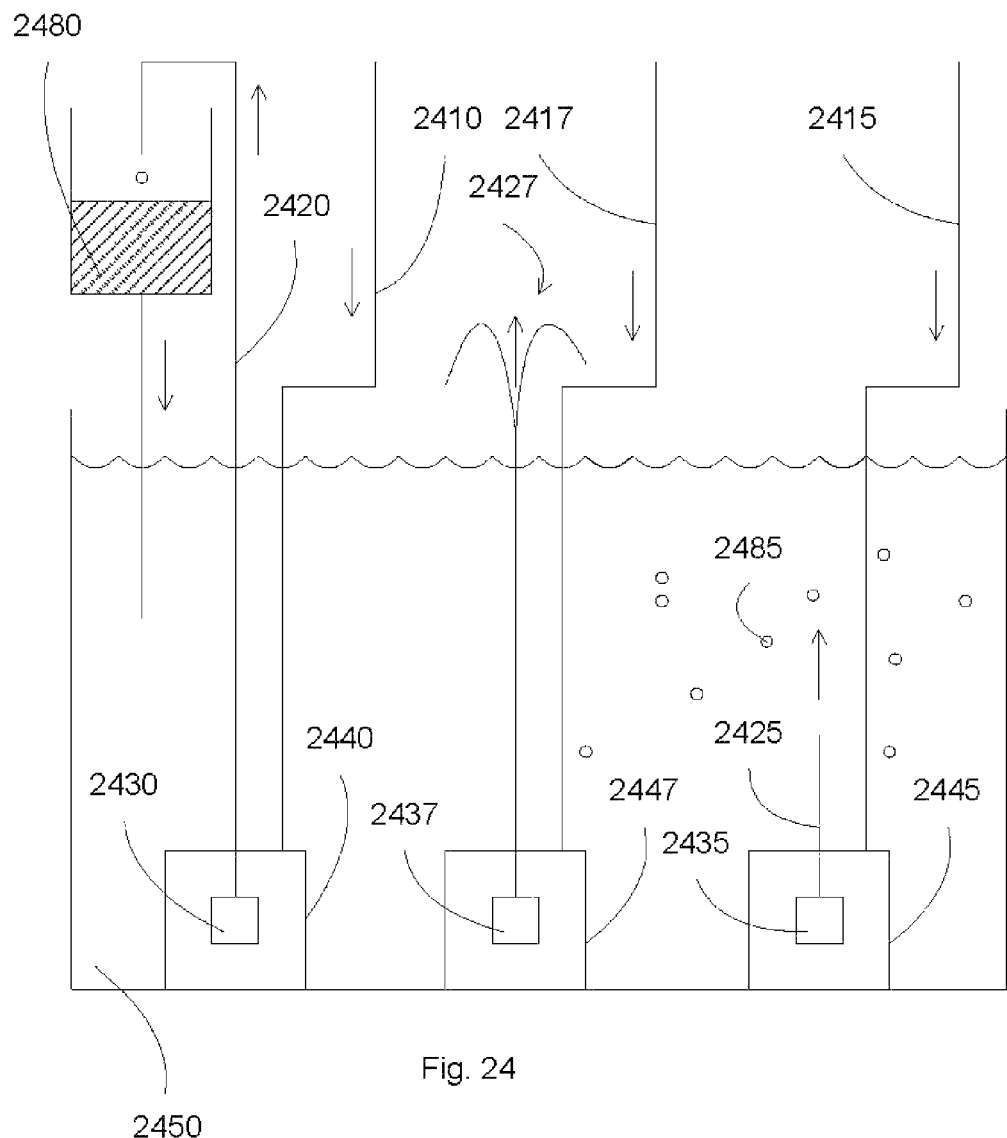
FIG. 24 illustrates a swimming pool system according to some embodiments of the present invention.

FIG. 24 illustrates a swimming pool set up according to some embodiments. A vortex aerated pump 2445 is disposed in a liquid 2450. Gas flow 2415, such as air flow, can be provided to the vortex aerated pump and a mixture of liquid and gas can be released at outlet 2425, for example, in pulse mode due to the release feature 2435. The mixture flow can aerate the liquid 2450, e.g., having bubbles 2485 that can be dissolved in the liquid. An optional porous element can be included to regulate the bubbles at the outlet flow. The flow can stir the liquid, creating liquid movement to prevent stagnant liquid, thus limiting algae or bacteria growth.

Another vortex aerated pump 2447 is disposed in liquid 2450. Gas flow 2417, such as air flow, can be provided to the gas pump and a mixture of liquid and gas can be pumped at outlet 2427, for example, in pulse mode due to the release feature 2437. The pump can deliver aerated liquid as a liquid fountain.

Another vortex aerated pump 2440 is disposed in a liquid 2450. Gas flow 2410, such as air flow, can be provided to the gas pump and a mixture of liquid and gas can be pumped at outlet 2420, for example, in pulse mode due to the release feature 2430. The mixture flow can be provided to a filter 2480 before returning to the container, effectively filtering the liquid.

Other configurations can be used, such as multiple filtering pumps or multiple aerated pumps, filtering pumps without aerated pumps, or aerated pumps without filtering pumps.

Figure 25A:
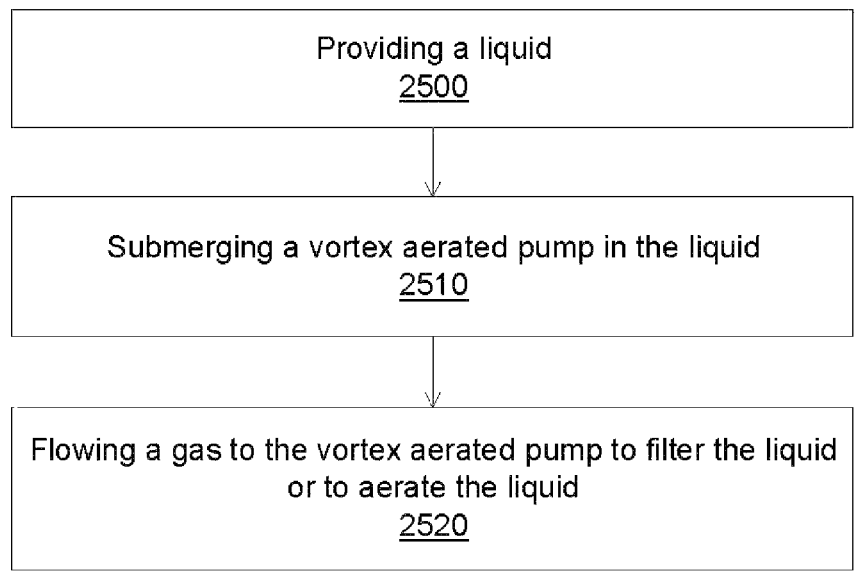
FIGS. 25A-25B illustrate flowcharts for cleaning a liquid according to some embodiments of the present invention.
Figure 25B:
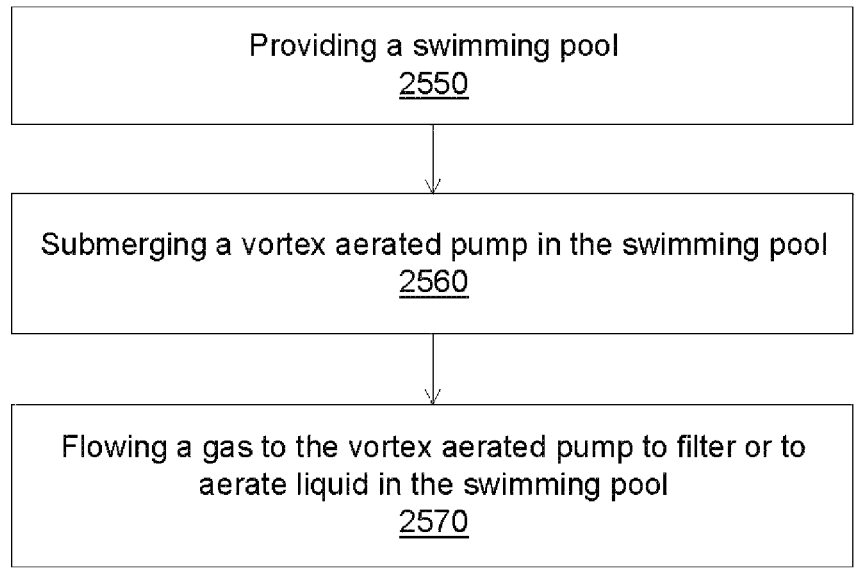

FIG. 25A-25B illustrate flowcharts for cleaning a liquid according to some embodiments. In FIG. 25A, a liquid can be cleaned by a vortex aerated pump. The liquid can be in a swimming pool or in a water softener tank. The vortex aerated pump can clean the liquid without chemical additives. In operation 2500, a liquid is provided, for example, in a container such as a swimming pool or a water softener tank. In operation 2510, a vortex aerated pump is submerged in the liquid. In operation 2520, a gas, such as air, can be flown to the vortex aerated pump. The outlet of the pump can be returned to the liquid with or without being filtered.

In FIG. 25B, a swimming pool can be cleaned by a vortex aerated pump. In operation 2550, a swimming pool is provided. In operation 2560, a vortex aerated pump is submerged in the liquid of the swimming pool. In operation 2570, a gas, such as air, can be flown to the vortex aerated pump. The outlet of the pump can be returned to the liquid with or without being filtered.

In some embodiments, the vortex aerated pump can be used to treat alums, e.g., solution having contaminants $AB(SO_4)_2 \cdot nH_2O$. A can be an alkali metal or ammonium compounds, such as sodium, potassium, rubidium, caesium, or thallium(I), or a compound cation such as ammonium ($NH^+_4$), methylammonium ($CH_3NH^+_3$), hydroxylammonium ($HONH^+_3$) or hydrazinium ($N_2H^+_5$). B can be a trivalent metal, aluminium, chromium, titanium, manganese, vanadium, iron(III), cobalt(III), gallium, molybdenum, indium, ruthenium, rhodium, or iridium. n often can be 12. Typical alums are potassium alum, e.g., aluminum potassium sulfate $KAl(SO_4)_2 \cdot 12H_2O$, soda alum, e.g., sodium aluminum sulfate $NaAl(SO_4)_2 \cdot 12H_2O$, ammonium alum, e.g., ammonium aluminium sulfate $NH_4Al(SO_4)_2 \cdot 12H_2O$, chrome alum, e.g., potassium chromium sulfate $KCr(SO_4)_2 \cdot 12H_2O$, aluminum sulfate $Al_2(SO_4)_3 \cdot 12H_2O$.

Alums can have double sulfates with the general formula $A_2SO_4 \cdot B_2(SO_4)_3 \cdot 24H_2O$, where A is a monovalent cation such as sodium, potassium, rubidium, caesium, or thallium (I), or a compound cation such as ammonium ($NH^+_4$), methylammonium ($CH_3NH^+_3$), hydroxylammonium ($HONH^+_3$) or hydrazinium ($N_2H^+_5$), and B is a trivalent metal ion, such as aluminium, chromium, titanium, manganese, vanadium, iron(III), cobalt(III), gallium, molybdenum, indium, ruthenium, rhodium, or iridium. Sometimes selenate can replace sulfur to form seletate containing alums, such as selenium alums or selenate alum ($SeO^{2-}$).

In some embodiments, the vortex aerated pump can add oxygen to the contaminated water, oxygenating metal ions having valence 2 into metal ions having valence 3, which can solidify and then filter out. For example, a vortex aerated pump can be submerged in contaminated water, providing oxygen to the water, and pumping water to a filter to remove particulates.

Figure 26:
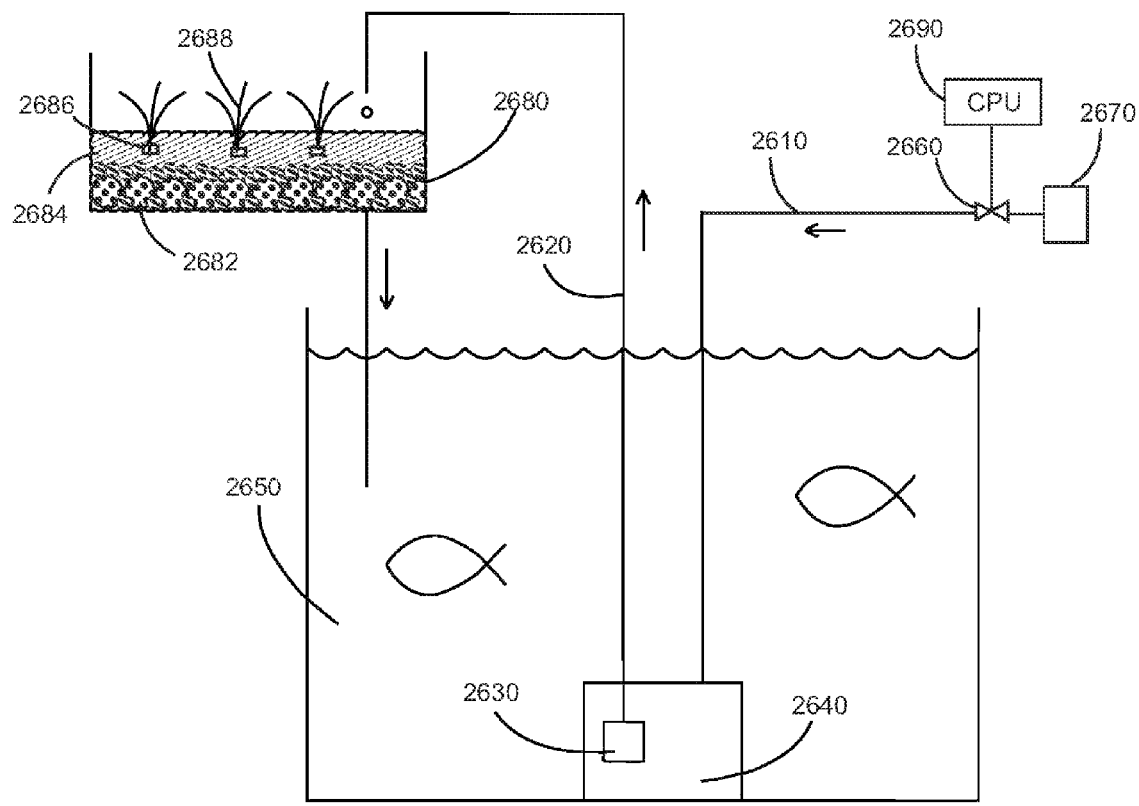
FIG. 26 illustrates an aquaponic system to some embodiments of the present invention.

FIG. 26 illustrates an aquaponic system to some embodiments of the present invention. A gas pump 2640 is disposed in a fish tank 2650. Gas flow 2610, such as air flow, can be provided to the gas pump and a mixture of liquid and gas can be pumped at outlet 2620, for example, in pulse mode due to the release feature 2630. The mixture flow can be provided to a plant bed 2680, effectively pumping the liquid from the fish tank 2650 to water the plants 2688. The plants are rooted in a growing medium 2686, preferably coco fibers, specifically coco choir. The growing medium is placed upon a drainage structure consisting of a progressively ascending pyramid of small and large rocks 2682. The growing medium and rock structure act as a natural filter when the liquid is returned to the fish tank. Moisture sensors 2686 are provided; which alert a computer processing unit (CPU) 2690 when the plants require watering. The CPU is in communication with a solenoid valve 2660 that can stop the flow of air provided by the flow generator 2670. Additional aeration of the fish tank can also be included, such as another gas pump to prevent stagnant liquid, thus limiting algae or bacteria growth, especially when valve 2660 is closed.

Figure 27:
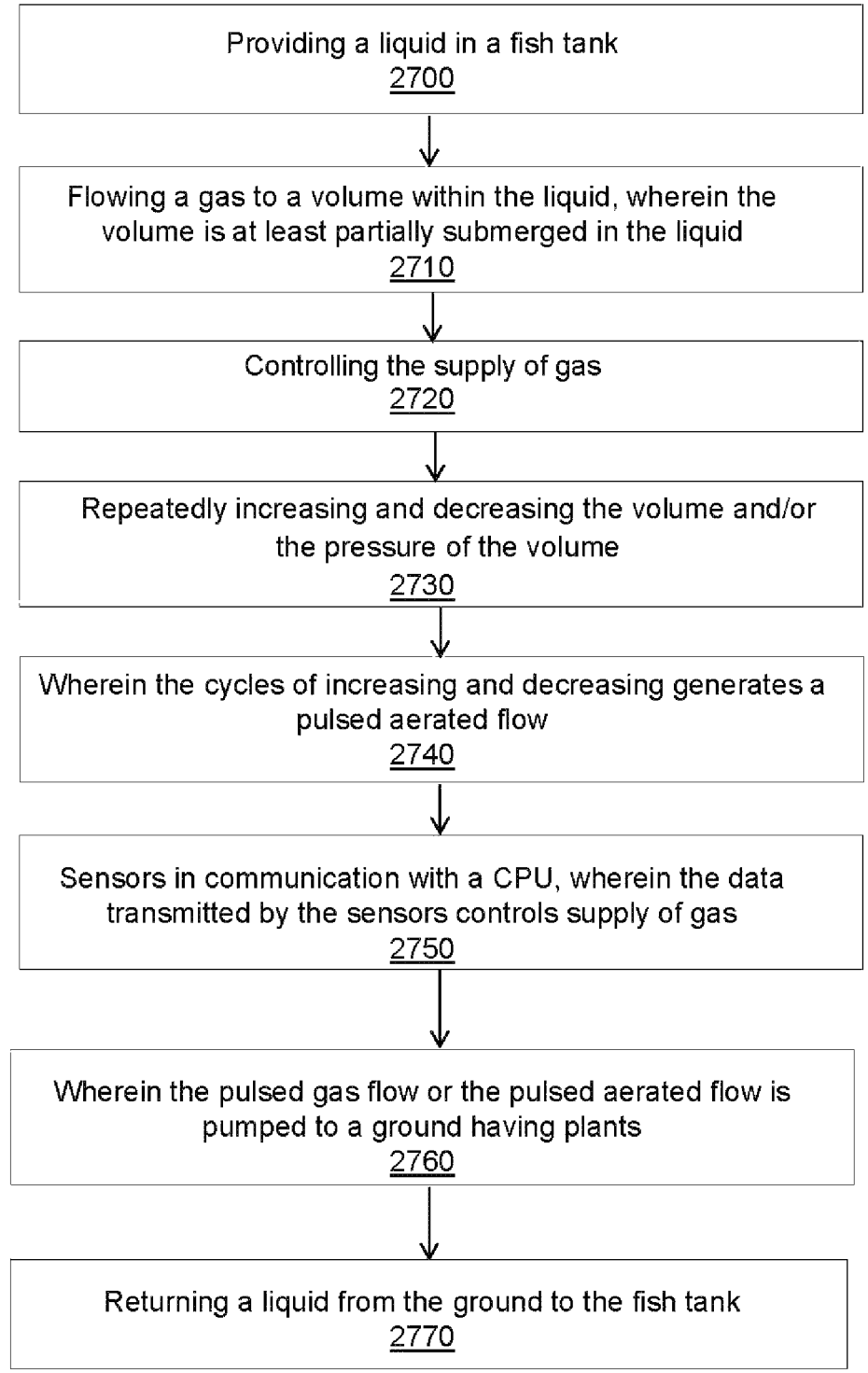
FIG. 27 illustrates a flowchart for an aquaponic system according to some embodiments of the present invention.

FIG. 27 illustrates a flowchart for an aquaponic system according to some embodiments of the present invention. In operation 2700, a liquid is provided, for example, in a container such as a fish tank. In operation 2710, a gas, such as air, can be flown to a volume within the liquid. The volume can be submerged in the liquid. In operation 2720, the supply of gas is controlled by a solenoid valve. In operation 2730, the volume and/or the pressure of the volume can be repeatedly increased and decreased, for example, due to a release feature disposed in the volume. In operation 2740, the volume or pressure cycling can generate a pulsed gas flow, an aerated gas flow, or a mixture flow of gas and liquid. In operation 2750, sensors in communication with a central processing unit (CPU), wherein the data transmitted by the sensors controls the supply of gas, i.e., opening and closing the solenoid valve. In operation 2760, the pulsed flow is pumped to a ground having plants. In operation 2770, the liquid from the ground is returned to the fish tank.

In some embodiments, the gas pump may be located beneath the ground, specifically buried below the bottom of the fish tank, in the bedrock. This is especially beneficial in aquaponic applications, such as fish farms, as this eliminates the need for a separate tank or container for the nitrification process.

Figure 28:
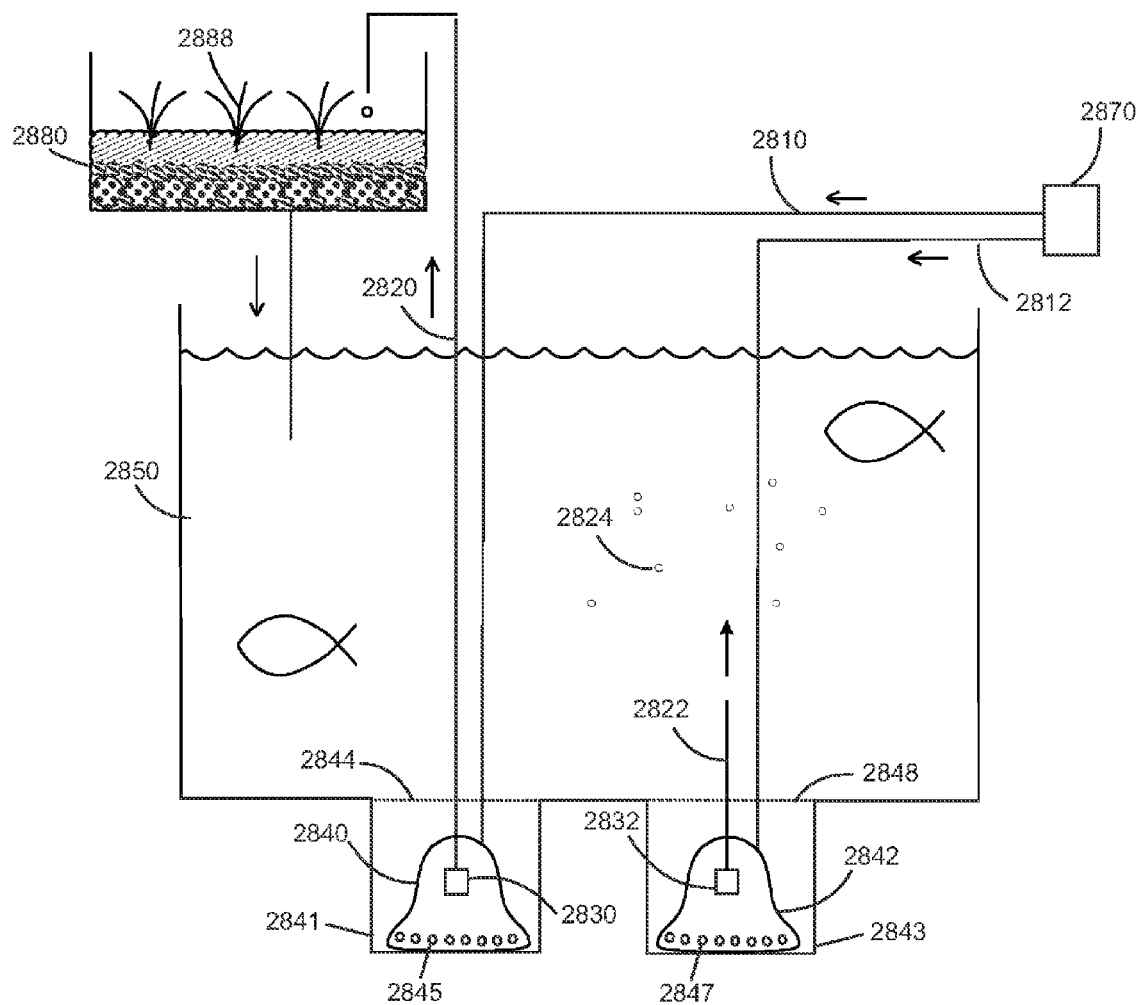
FIG. 28 illustrates an aquaponic system to some embodiments of the present invention.

FIG. 28 illustrates an aquaponic system to some embodiments of the present invention. A gas pump 2840 is disposed beneath a fish tank 2850 in basin 2841. Gas flow 2810, such as air flow, can be provided to the gas pump and a mixture of liquid and gas can be pumped at outlet 2820, for example, in pulse mode due to the release feature 2830. The mixture flow can be provided to a plant bed 2880, effectively pumping the liquid from the fish tank 2850 to water the plants 2888. To prevent stagnation, additional aeration of the liquid can also be included, such as another gas pump 2842 located beneath fish tank 2850 in basin 2843. Gas flow 2812, such as air flow, can be provided to the gas pump and a mixture of liquid and gas can be released at outlet 2822, for example, in pulse mode due to the release feature 2832. The mixture flow can aerate the liquid, e.g., having bubbles 2824 that can be dissolved in the liquid. An optional porous element can be included to regulate the bubbles at the outlet flow.

In this embodiment, gas pumps 2840/2842 are of bell shape, consisting of openings 2845/2847 allowing liquid to enter gas pump. The gas pumps are positioned at the bottom of basins 2841/2843 and covered in rocks to bedrock level at openings 2844/2848. The rocks create natural draining allowing liquid to enter basins at openings 2844/2848 and then enter each corresponding gas pump through openings 2845/2847. The basins can be constructed from a plurality of materials including, but not limited to concrete and plastic. Likewise, the gas pumps can be constructed from a plurality of materials including, but not limited to concrete and plastic.

Figure 29:
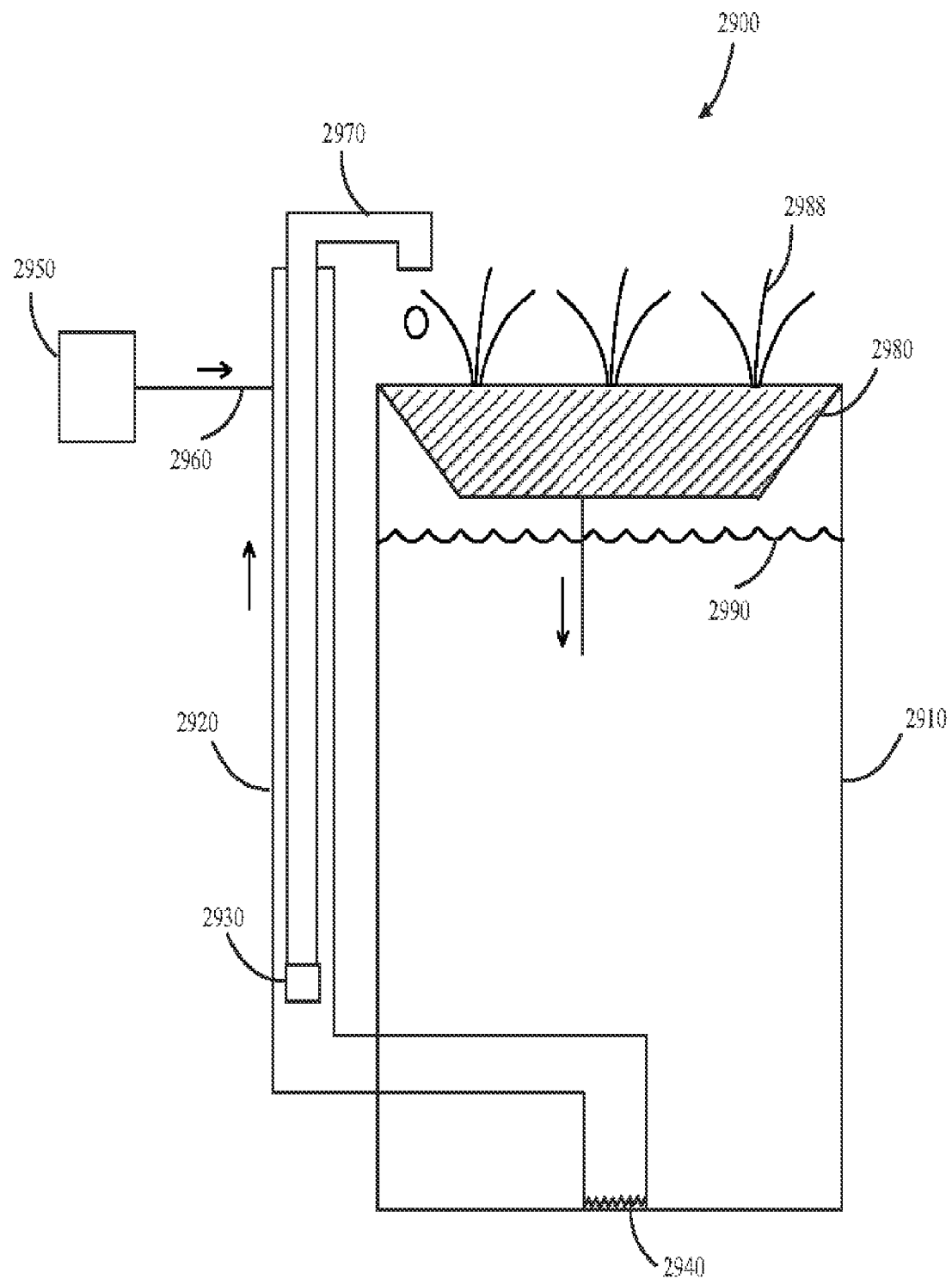
FIG. 29 illustrates a cross-section of an aquaponic system to some embodiments of the present invention.

FIG. 29 illustrates a cross-section of an aquaponic system 2900 to some embodiments of the present invention. A gas pump 2920 is disposed outside a liquid container 2910. The gas pump is in fluid communication with the container by openings 2940 on the bottom of a conduit. Gas flow 2960, such as air flow, can be provided by a gas source 2950 to the gas pump and a mixture of liquid and gas can be pumped at outlet 2970, for example, in pulse mode due to the release feature 2930. The mixture flow can be provided to a plant bed 2980, effectively pumping the liquid from the container 2910 to water the plants 2988. The liquid then returns to the container. The container further includes a liquid level 2990, which may vary in height depending on desired aquaponic method. For example, the liquid level may be raised at or above the plant bed suspending plant roots into the liquid for a deep water culture growing method.

Figure 30:
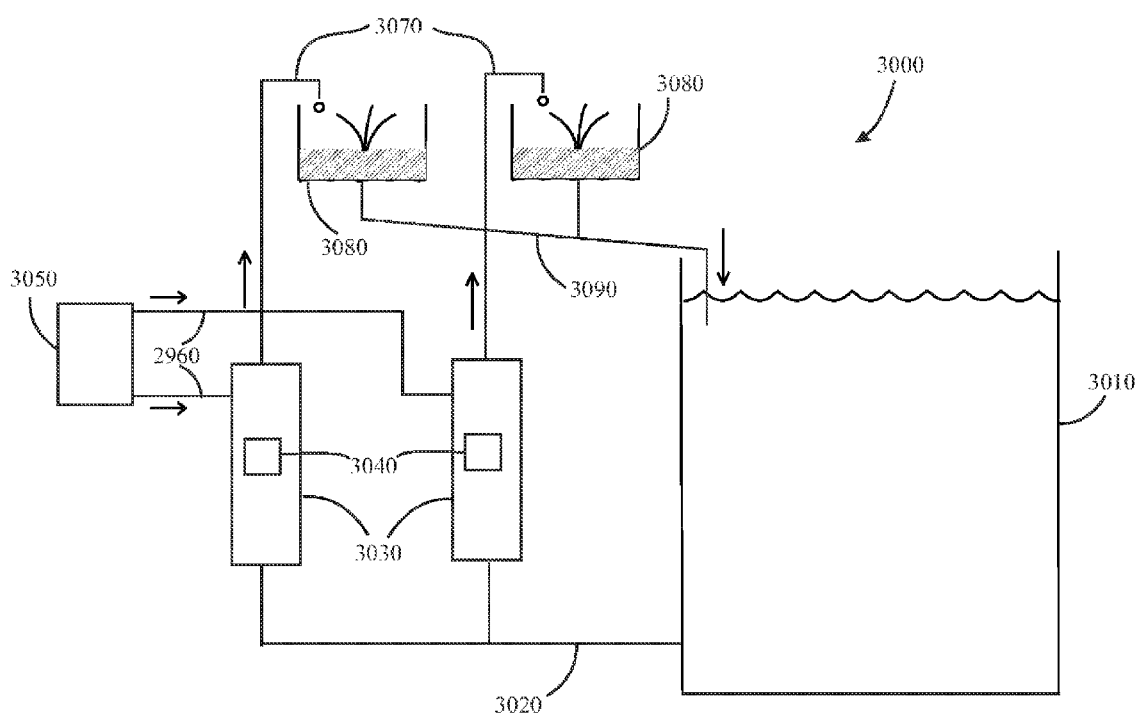
FIG. 30 illustrates a cross section of an aquaponic system to some embodiments of the present invention.

FIG. 30 illustrates an aquaponic system 3000 to some embodiments of the present invention. A plurality of gas pumps 3030 is disposed outside a liquid container 3010. The plurality of gas pumps are in fluid communication with the container by conduit 3020. Gas flow 3060, such as air flow, can be provided by a gas source 3050 to the plurality of gas pumps and a mixture of liquid and gas can be pumped at outlets 3070, for example, in pulse mode due to release features 3040. The mixture flow can be provided to a plurality of plant beds 3080, effectively pumping the liquid from the container 3010 to water the plants. The liquid then returns to the container by way of conduit 3090, which is on a sloped grade to allow the liquid to return to the container with the aid of gravity. Although, two gas pumps and two corresponding plant beds are illustrated, it is understood that numerous gas pumps and plant beds may exist.

It will be apparent to the skilled person that there may be many alterations in the embodiments described without departing from the scope of the invention. For example, although a liquid having a consistency such as water is discussed above other fluid and liquids may apply to the present invention, such as a flammable liquid, a viscous fluid, and fluids with particulates.

What is claimed is:

1. A liquid treatment system comprising:
a gas source,
a container for containing a liquid,
a pump submerged in the liquid, the pump including a housing consisting of a top portion, a lower portion, and an inner volume,
the lower portion of housing including one or more openings allowing fluid communication between the inner volume and the container creating a liquid surface disposed in the inner volume,
the top portion of the housing coupled to an inlet, the inlet coupled to the gas source to deliver a gas from the gas source to the inner volume, the gas is trapped within the inner volume of the housing creating an inner volume of gas,
the housing coupled to an outlet,
the pump includes a release feature coupled to the outlet, the release feature is positioned at a distance from the top portion,
the gas source supplying the gas to the inlet such that:
the inner volume of gas expands displacing the liquid surface in a downward direction,
wherein the liquid surface reaches the release feature, the outlet delivers a liquid/gas mixture; and
wherein the release feature includes a plurality of cuts having a slope curve shape forming a plurality of wings, the plurality of wings regulating an oscillation behavior of the liquid/gas mixture.

2. The system of claim 1 wherein the outlet delivers an aerated vortex flow.

3. The system of claim 2 wherein the aerated vortex flow is delivered to the container to aerate the liquid.

4. The system of claim 2 wherein the aerated vortex flow is delivered to a plant bed, the aerated vortex flow not absorbed by the plant bed is returned to the container.

5. The system of claim 4 wherein the container is a fish tank.

6. The system of claim 2 wherein the aerated vortex flow is delivered to a filter then returned to the container.

7. The system of claim 6 wherein the container is a swimming pool.

8. The system of claim 1 wherein the pump includes a shape of at least one of a bell and a cylinder.

9. The system of claim 1 wherein the pump includes a material consisting of concrete or plastic, wherein the pump consisting of the plastic material includes a counter weight to overcome the buoyancy force of the inner volume of gas.

10. The system of claim 1 wherein the gas source is powered by at least one of a solar panel and a windmill providing a self-sustained system.

11. An aquaponic system comprising:
a gas source,
a fish tank containing a liquid,
a plurality of pumps submerged in the liquid, the plurality of pumps having a housing consisting of a top portion, a lower portion, and an inner volume,
the lower portion of housing including one or more openings allowing fluid communication between the inner volume and the fish tank creating a liquid surface disposed in the inner volume,
the top portion of the housing coupled to an inlet, the inlet coupled to the gas source to deliver a gas from the gas source to the inner volume, the gas is trapped within the inner volume of the housing creating an inner volume of gas,
the housing coupled to an outlet,
the plurality of pumps include a release feature coupled to the outlet, the release feature is positioned at a distance from the top portion,
the gas source supplying the gas to the inlet such that:
the inner volume of gas expands displacing the liquid surface in a downward direction,
wherein the liquid surface reaches the release feature, the outlet delivers a an aerated vortex flow; and
the release feature includes a plurality of cuts having a slope curve shape forming a plurality of wings, plurality of the wings regulating an oscillation behavior of the aerated vortex flow,
the aerated vortex flow is delivered to a plant bed, the aerated vortex flow not absorbed by the plant bed is returned to the fish tank.

12. A method of operating a gas pump comprising steps:
(a) providing a liquid in a container;
(b) flowing a gas to a volume within the liquid, wherein the volume is at least partially submerged in the liquid; and
(c) repeatedly increasing and decreasing the volume, wherein the cycles of increasing and decreasing generates a pulsed aerated flow, wherein at least one of the pulsed aerated flow is released within the container and the pulsed aerated flow is a vortex flow released outside the container, wherein the vortex flow is used to treat contaminated liquid consisting of alums and particulates.

13. The method of claim 12 wherein step (c), a release feature is activated decreasing the volume.

14. The method of claim 12 wherein the container is a swimming pool.

15. The method of claim 12 wherein step (c), the pulsed aerated flow is pumped to a ground having plants; and further comprising a step (d) returning a liquid from the ground to the container.

16. The method of claim 15 wherein the container is a fish farm, the fish farm having a bedrock.

17. The method of claim 16 wherein the gas pump is buried in the bedrock.

* * * * *